United States Patent
Saxton et al.

(10) Patent No.: US 10,652,625 B1
(45) Date of Patent: May 12, 2020

(54) SYNCHRONIZATION OF MULTIPLE ENCODERS FOR STREAMING CONTENT

(71) Applicant: Amazon Technologies, Inc., Seattle, WA (US)

(72) Inventors: John Robert Saxton, Portland, OR (US); Kevin Moore, Portland, OR (US); Ryan Paul Hegar, Clackamas, OR (US); Michael Reddick Coleman, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 15/194,347

(22) Filed: Jun. 27, 2016

(51) Int. Cl.
| | |
|---|---|
| *H04N 21/647* | (2011.01) |
| *H04L 29/06* | (2006.01) |
| *H04N 21/2343* | (2011.01) |
| *H04N 21/242* | (2011.01) |
| *H04N 21/63* | (2011.01) |
| *H04N 21/2365* | (2011.01) |
| *H04N 21/8547* | (2011.01) |
| *H04N 19/436* | (2014.01) |

(52) U.S. Cl.
CPC ........ *H04N 21/647* (2013.01); *H04L 65/607* (2013.01); *H04N 19/436* (2014.11); *H04N 21/2365* (2013.01); *H04N 21/23439* (2013.01); *H04N 21/234309* (2013.01); *H04N 21/242* (2013.01); *H04N 21/63* (2013.01); *H04N 21/8547* (2013.01); *H04L 65/4069* (2013.01); *H04L 65/602* (2013.01)

(58) Field of Classification Search
CPC .......... H04N 19/436; H04N 21/23439; H04N 21/8456; H04N 21/2365; H04N 21/8547; H04N 21/647; H04N 21/63; H04N 21/242; H04L 65/607
See application file for complete search history.

(56) References Cited

U.S. PATENT DOCUMENTS

| | | | |
|---|---|---|---|
| 5,652,749 A | | 7/1997 | Davenport et al. |
| 6,064,438 A | * | 5/2000 | Miller .................. H04N 5/4401 348/465 |
| 9,900,577 B2 | | 2/2018 | Kim et al. |
| 10,423,481 B2 | * | 9/2019 | Iturralde .............. H04N 21/236 |
| 2002/0035732 A1 | | 3/2002 | Zetts |
| 2004/0001591 A1 | | 1/2004 | Mani et al. |
| 2005/0262537 A1 | | 11/2005 | Baran et al. |

(Continued)

*Primary Examiner* — Gregory G Todd
(74) *Attorney, Agent, or Firm* — Knobbe, Martens, Olson & Bear, LLP

(57) ABSTRACT

Systems and methods are described to enable synchronized encoding of streaming audio or video content between multiple encoders, in a manner that provides for seamlessly interchangeable encodings. Within a pool of encoders, each encoder can periodically generate state information regarding its state of encoding, and share that state information with other encoders. The other encoders can compare the state information to their current state, to determine whether a desynchronization has occurred. When a desynchronization does occur, such as due to intermittent network packet loss, the encoders within the pool can evaluate the shared state information to determine an authoritative state, and then resynchronize to the authoritative state, resulting in identical or interchangeable encoded content being output from each encoder of the pool.

23 Claims, 11 Drawing Sheets

(56) References Cited

U.S. PATENT DOCUMENTS

| | | |
|---|---|---|
| 2006/0136768 A1 | 6/2006 | Liu et al. |
| 2006/0282783 A1 | 12/2006 | Covell et al. |
| 2006/0291798 A1 | 12/2006 | Suneya |
| 2007/0109162 A1 | 5/2007 | Hwang |
| 2010/0161825 A1 | 6/2010 | Ronca et al. |
| 2010/0218227 A1 | 8/2010 | Frink et al. |
| 2011/0096828 A1 | 4/2011 | Chen et al. |
| 2011/0150099 A1 | 6/2011 | Owen |
| 2011/0235703 A1* | 9/2011 | Labrozzi .......... H04N 21/23424 375/240.02 |
| 2011/0276712 A1 | 11/2011 | Narula et al. |
| 2012/0042050 A1 | 2/2012 | Chen et al. |
| 2012/0128061 A1* | 5/2012 | Labrozzi ........ H04N 21/234354 375/240.02 |
| 2012/0147958 A1* | 6/2012 | Ronca .................. H04N 19/124 375/240.16 |
| 2012/0179833 A1 | 7/2012 | Kenrick et al. |
| 2012/0230389 A1 | 9/2012 | Laurent et al. |
| 2014/0132837 A1 | 5/2014 | Ye et al. |
| 2015/0189225 A1 | 7/2015 | Soroushian et al. |
| 2015/0221316 A1 | 8/2015 | Mufti |
| 2015/0237094 A1* | 8/2015 | Einarsson ............... H04L 65/60 709/203 |
| 2015/0281746 A1 | 10/2015 | Lam |
| 2015/0281752 A1* | 10/2015 | Van Veldhuisen ......................... H04N 21/2368 725/116 |
| 2016/0057317 A1 | 2/2016 | Zhao et al. |
| 2016/0063434 A1 | 3/2016 | Kim et al. |
| 2016/0134881 A1 | 5/2016 | Wang et al. |
| 2016/0134945 A1 | 5/2016 | Gower et al. |
| 2016/0286260 A1 | 9/2016 | Lawrence et al. |
| 2016/0301957 A1* | 10/2016 | McCarthy ............. H04N 19/85 |
| 2016/0337672 A1 | 11/2016 | Lee et al. |
| 2017/0048536 A1* | 2/2017 | Forehand ............ H04N 19/436 |
| 2017/0064342 A1 | 3/2017 | Botsford et al. |
| 2017/0094329 A1* | 3/2017 | Fliam .................... G11B 27/10 |
| 2017/0103769 A1 | 4/2017 | Laaksonen et al. |
| 2017/0366833 A1 | 12/2017 | Amidei et al. |

\* cited by examiner

SYNCHRONIZATION OF MULTIPLE ENCODERS FOR STREAMING CONTENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying, or distributing streaming television or radio content. In other instances, these computing devices may serve to replicate or replace prior content distribution systems. For example, data centers can provide network-based streaming audio or video content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software is used to replace or replicate functionality of dedicated hardware devices. For example, software applications may be used to encode and package a data stream containing live video content, thus reducing or eliminating the need for dedicated hardware to perform these functions. Because of the flexibility of software-based solutions, a single computing device may be utilized to generate content for both traditional and network-based generation systems.

DETAILED DESCRIPTION

Figure 1:
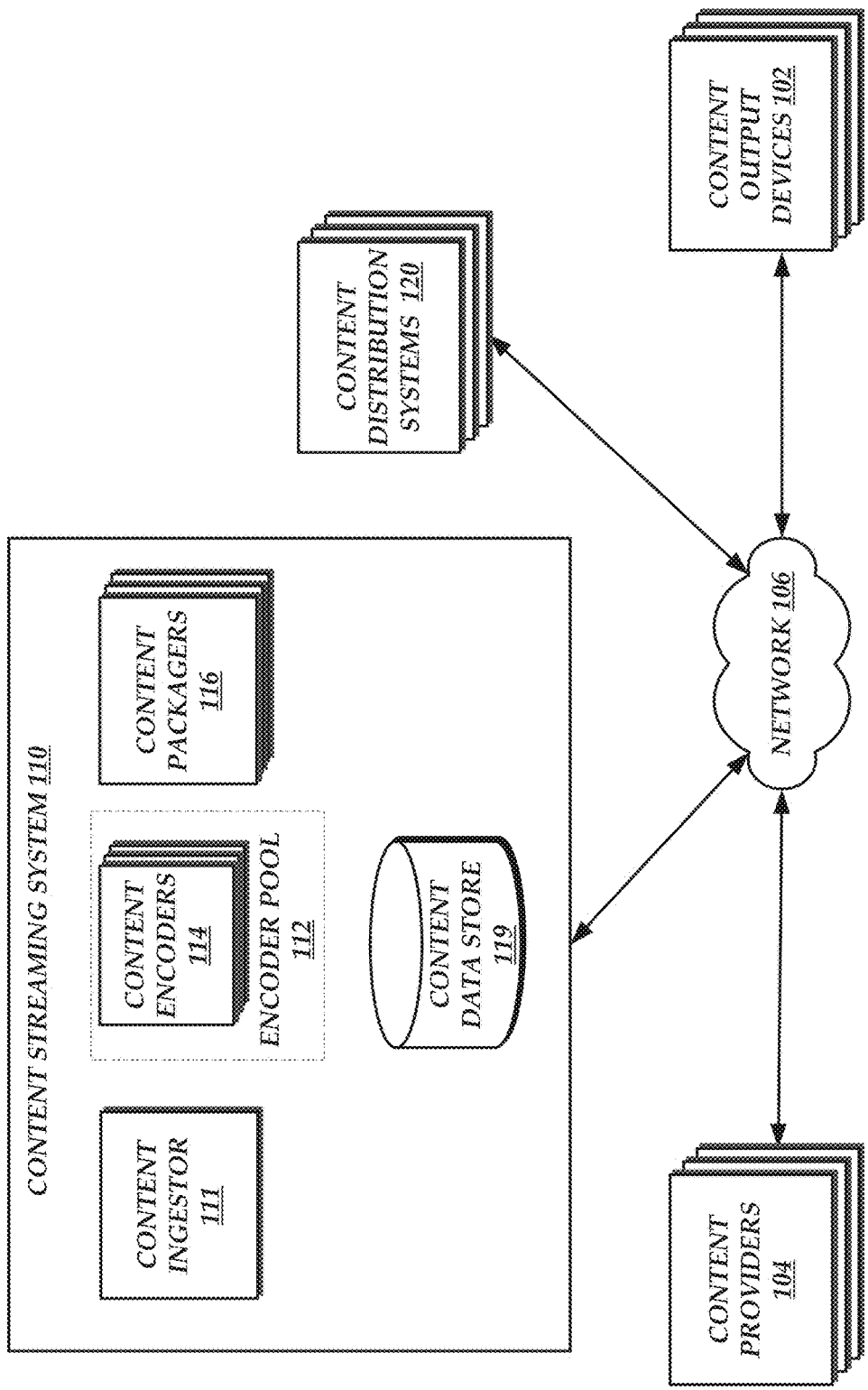
FIG. 1 is a block diagram depicting an illustrative logical network environment including content output devices, content providers, content distribution systems, and a content streaming system configured to provide encoded and packaged streaming content by use of multiple redundant or cooperative encoders having synchronized encoding states.

Generally described, the present disclosure relates to providing streaming content over a communication network, by utilizing multiple, redundant or cooperative content encoders sharing a common synchronization state. More specifically, the present disclosure relates to a streaming content system that includes multiple content encoders, which may utilize a synchronization protocol to ensure synchronization of the encoded content output by the content encoders. The synchronization protocol allows for synchronization of encoding states and ensures that content output by the encoders is identical or fully interchangeable by a content packager.

Generally described, streaming content can include any content that is intended to be processed (e.g., ingested, encoded, packaged, etc.) and delivered in "real-time," such as television, radio, or network-based content streams. In one embodiment, streaming content is live content (e.g., being both recorded and presented in "real-time," which may include minor delays, such as to provide the ability for content censoring or filtering). While a single computing device might be used to process a content stream, any failure or delay by that computing device might cause a corresponding failure or delay in the content stream. Moreover, because of the "streaming" nature of that content, it may not be possible to recover a portion of the content that is lost due to delay or failure. For example, where a computing device processing a content stream fails and must reboot, the portion of the content stream (e.g., stemming from a live recording) may simply be lost to end viewers.

In the instance that a single device fails, other devices can continue to process the content stream, with the intention that end users experience an uninterrupted stream. However, despite concurrent processing of content, redundant devices may not be fully interchangeable, such that transitioning an end user between streams provided by redundant devices does not result in a "seamless" transition. Specifically, the content output by any processing device may be dependent at least in part on the state of that device, such as a current "timestamp" for content processed by the device, the arrangement of "segments" within the content, or other variables. Thus, in order to enable redundant content processing in a manner that allows for seamless transition between redundant output streams, the present disclosure provides for synchronizing the state of content processing devices, such as content encoders, to enable output of interchangeable or identical encoded content by the devices. Specifically, the present disclosure provides a protocol by which a content processing device can communicate with other content processing devices, to determine the state of those devices, detect desynchronization between devices, and synchronize with the other devices as necessary. In addition, the present disclosure provides a centralized controller, which may assist encoders in synchronizing states (thus either reducing or eliminating the need for an encoder itself to monitor or enforce synchronization state). After synchronization, each the content processing device can begin processing content according to the synchronized state, such that an output content stream is interchangeable with the content streams provided by other devices.

In accordance with aspects of the present disclosure, described herein is a content streaming system that includes a content ingestor to receive streaming content (e.g., from a live content source), a pool of content encoders configured to encode that streaming content, and a content packager configured to package the encoded content (received from the content encoders) and provide the packaged content to content output devices, such as such as computing devices, televisions, or radios, to content distribution systems, such as network-based systems, television networks, or radio networks, or both. As described in more detail below, individual content encoders of a content pool, alone or with the aid of a centralized controller, can function to synchronize their encoding with that of other encoders within the encoder pool, such that the segmentation of content output by two encoders, as well as the values reflected in that output content, are synchronized. Specifically, during encoding, each encoder (and additionally or alternatively, a centralized controller) can gather state data regarding the content being encoded or output by encoders within the pool. The state information may reflect include any information regarding the functioning of the reference encoder, such as a timecode at which the reference encoder began encoding content or the configuration parameters of the encoder. As used herein, timecode generally refers to a time value encoded into a content stream by a recording device, such as a digital video recorder. The encoders or centralized controller can then detect desynchronization between encoders, based on differences in the obtained state data. Where a desynchronization has occurred, the encoder or centralized controller can use the information within the state data to determine an authoritative state, and any desynchronized controllers can utilize the authoritative state to regain synchronization with the pool.

Synchronization of encoding may require, for example, synchronization of segmentation boundaries within encoded content. As described in detail below, segmentation boundaries generally refer to boundaries between time-based logical divisions of encoded content. For example, with respect to video content, segmentation boundaries may designate the transition between a first group of pictures ("GOP") and a second GOP, with each group of pictures representing a collection of video frames that are collectively encoded, or may designate collections of GOPs. With respect to audio, segmentation boundaries may designate a transition between audio "segments," which hold collections of audio "frames," which in turn hold collections of audio samples (generally the lowest-level representation of audio within digital content).

Additionally or alternatively, synchronization of encoding may require synchronization of timestamp values within encoded content. Timestamp generally refers to a time value encoded into a content stream by an encoding device, which may be used to facilitate decoding or presentation of the content. Timestamp values may have a relatively high resolution (e.g., 10 million values per second, often synchronized to a system clock of an encoding device), and thus facilitate highly accurate playback. However, unlike timecode values (which are generally encoded into content by a recording device), timestamp values are often determined independently at an encoder. Because these timestamp values can be utilized by downstream devices (e.g., a content packager or a content output device), differences in timestamp values can result in erroneous, uneven, or unsynchronized packaging or playback. Thus, to enable seamless transition between encoded content streams at a content package, each content encoder may be required to maintain synchronized timestamp values. Accordingly, the content encoders disclosed herein can be configured to utilize a synchronization protocol that, on initialization of an encoder, enables the encoders to receive state information from a reference encoder (e.g., that has previously operated to encode content), and utilize the state information to synchronize its own state, including its own timestamp. The content encoder can then begin encoding in a synchronized manner. In this manner, the content encoders can provide truly interchangeable content streams to a content packager, thus providing redundancy and resiliency in the content streaming system.

In some instances, an encoder may utilize or encode within content more than one timestamp value. For example, where an encoder utilizes specific encoding styles, it may be necessary for a later decoder to decode content in a different order than that content is presented (e.g., such that frames of video are decoded "out of order"). Accordingly, the encoder may provide both a "presentation" timestamp, reflecting a time at which a given portion of content should be output, and a "decoding" timestamp, reflecting a time at which the portion should be decoded. The systems and methods described herein may be utilized to synchronize either or both of such types of timestamp. For example, where encoded content is intended for inclusion in streaming content formatted according to the MICROSOFT™ Internet Information Services (IIS) Smooth Stream protocol, timestamps may refer to "fragment absolute time" values within the encoded content.

While examples are provided herein with respect to redundant content encoders, embodiments of the present disclosure may be also implemented with respect to cooperative content encoders, such as content encoders that provider interchangeable, but not identical, content streams. For example, aspects of the present disclosure may enable synchronization of a first content encoder that operates to encode content into a first format (e.g., standard definition, or "SD") and a second content encoder that operates to encode content into a second format (e.g., high definition, or "HD"). Thus, content packagers, output devices, or distribution systems may be enabled to interchangeably utilize either format of content stream without interruption. Advantageously, the use of multiple encoders to encode content into different and interchangeable formats can allow greater variety of available formats than would be possible to encode on a single encoder, or may reduce the computing resources needed to individual encoders (e.g., enabling the use of lower cost, commodity grade hardware to encode content rather than more expensive, specialized hardware).

As will be appreciated by one of skill in the art in light of the present disclosure, the embodiments disclosed herein improves the ability of computing systems, such as content streaming systems, to deliver content to users in a resilient and/or cooperative manner. Specifically, aspects of the present disclosure improve the ability of content streaming systems to utilize redundant or cooperative encoding devices while allowing for seamless transition between the outputs of such devices, even in instances where transmission losses or errors occur. Moreover, the presently disclosed embodiments address technical problems inherent within computing systems; specifically, the unreliability of non-redundant systems, the limited ability of a single device to encode content according to a variety of formats or parameters, the inherently unsynchronized nature of multiple systems, the difficulty in establishing synchronization in such systems (particularly in the context of live streams), and the inherent potential for inconsistency when transmitting content (particularly streaming content) to multiple devices (e.g., due to the potential for "dropped" content at one but not all devices). These technical problems are addressed by the various technical solutions described herein, including the use of content encoders that can achieve synchronization according to a synchronization protocol (alone or with the assistance of a content controller), and that can utilize the synchronization protocol to establish synchronized encoder states and generate identical or interchangeable encoded content. Thus, the present disclosure represents an improvement on existing content streaming systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple content output devices 102, content providers 104, and content distribution systems 120 in communication with a streaming content delivery system 110 via a network 106. While the content output devices 102, the content providers 104, and the content distribution systems 120 are shown as grouped within FIG. 1, the content output devices 102, content providers 104, and content distribution systems 120 may be geographically distant, and independently owned or operated. For example, the content output devices 102 could represent a multitude of devices in various global, continental, or regional locations accessing the content streaming system 110. Further, the content providers 104 could represent a multitude of related or distinct parties that have associated with the content streaming system 110 to provide streaming content to the content output devices 102. Still further, the content distribution systems 120 could represent a multitude of related or distinct parties enabling distribution of content from the content streaming system 110 to the content output devices 102. While shown as distinct, any one or more of the content streaming system 110, content output devices 102, content providers 104, or content distribution systems 120 may be operated by a common entity, or by a common computing device. Accordingly, the groupings of content output devices 102, content providers 104, content streaming system 110, and content distribution systems 120 within FIG. 1 is intended to represent a logical, rather than physical, grouping. Similarly, each of the components of the content streaming system 110 may be located within geographically diverse areas.

Network 106 may be any wired network, wireless network, or combination thereof. In some instances, network 106 may be a telecommunications network, such as a personal area network, local area network, wide area network, cable network, satellite network, cellular telephone network, or combination thereof operating via the internet protocol (IP). In other instances, the network 106 may be or may include other network types, such as television networks or radio networks. In the example environment of FIG. 1, network 106 is a global area network (GAN), such as the Internet. Protocols and components for communicating via the other aforementioned types of networks are well known to those skilled in the art of electronic communications and thus, need not be described in more detail herein. While each of the content output devices 102, content providers 104, content distribution systems 120, and content streaming system 110 is depicted as having a single connection to the network 106, individual components of the content output devices 102, content providers 104, content distribution systems 120, and content streaming system 110 may be connected to the network 106 at disparate points. Accordingly, communication times and capabilities may vary between the components of FIG. 1. While shown in FIG. 1 as a single network, the network 106 may represent different networks interconnecting the different components of FIG. 1. For example, the network 106 may represent a first network (e.g., the Internet) that interconnects the content streaming system 110 and the content distribution systems 120, and a second network (e.g., a television broadcasting network) that interconnects the content distribution system 120 and the content output devices 102.

Content output devices 102 may include any number of different devices configured to output content from the content streaming system 100 (e.g., directly or via the content distribution systems 120). For example, individual content output devices 102 may correspond to computing devices, such as a laptop or tablet computer, personal computer, wearable computer, server, personal digital assistant (PDA), hybrid PDA/mobile phone, mobile phone, electronic book reader, set-top box, camera, digital media player, and the like. As a further example, individual content output devices 102 may correspond to televisions, radios, or other output devices (e.g., which may or may not include or correspond to computing devices). Each content output device 102 may include hardware and/or software enabling the reception and output of streaming content, including dedicated playback hardware, dedicated software (e.g., specially programmed applications), and general purpose software (e.g., web browsers) capable of outputting streaming content (e.g., by downloading the content directly, downloading a web page including the content, etc.).

Content providers 104 may include any computing device owned or operated by an entity that provides content to the content streaming system 110 for subsequent transmission to content output devices 102. For example, content providers 104 may include servers hosting streaming audio or video, or may include recording devices transmitting content to the content streaming system 110 (e.g., digital video recorders).

Content distribution systems 120 can include any computing device owned or operated by an entity that assists in delivery of content from the content streaming system 110 to the content output devices 102. Illustratively, the content distribution systems 120 may include network-based content delivery networks ("CDNs") that provide a geographically-diverse set of points of presence ("POPs") from which content output devices 102 may obtain and output content. As a further illustration, the content distribution systems 120 may include distribution points in traditional networks, such as a television station, cable provider station, radio station, etc.

The content streaming system 110 can include a variety of components and devices configured to process streaming content obtained from a content provider and make processed content available to the content output devices 102 and/or the content distribution systems 120. Specifically, the content streaming system 110 can include a content ingestor 111 configured to obtain a stream of content (e.g., live content) from a content provider 104, and to provide that content to a pool 112 of content encoders 114 for encoding. The content provided to the content ingestor 111 may be in "raw," uncompressed or analog format, or in a format that is otherwise required to be "encoded" prior to delivery to the content output devices 102. Accordingly, the content ingestor 111 may pass the stream of content onto one or more content encoders 114, which can encode the content into one or more formats accepted by the content distribution systems 120 or the content output devices 102. While the term "encode" is used herein to discuss the processing of the content encoders 114, use of this term is not intended to limit that processing to conversion of analog to digital formats. Rather, the content encoders 114 may in some instances process digital content to convert that digital content into another digital format (sometimes referred to as "transcoding"), and the term "encode" is intended to encompass to such conversions. As discussed above, in order to provide redundant or cooperative encoding of content (e.g., to provide resiliency or adaptive-quality streaming), multiple content encoders 114 may be configured to encode the stream of content received from the content ingestor 111 according to the same or to interchangeable parameters.

In accordance with the present disclosure, to ensure the interchangeability of content output by the content encoders 114, the content encoders 114 may be configured to detect potential desynchronizations between content encoders 114 within the pool 112, and to utilize a synchronization protocol to exchange state information, enabling the content encoders 114 to reestablish synchronization and thus provide interchangeable outputs. More particularly, in one embodiment, each encoder 114 within the pool 112 can be configured to periodically transmit information regarding its encoding state to each other encoder 114. On receiving encoding state from another encoder 114, a receiving encoder 114 can verify that the received encoding state matches (e.g., is interchangeable with) its own state. In the instance that a received encoding state does not match the current state of an encoder 114, the encoder 112 can determine whether the received state is authoritative (indicating that its own state has become desynchronized from the pool 112) and if so, modify its output to resynchronize its state with that of the pool 112. In another embodiment, a single component, such as the content ingestor 111, may act as a controller in order to determine the authoritative encoding state for the pool 112. Accordingly, the ingestor 111 may periodically receive state information from each encoder 114, and use received state information to detect whether any encoder 114 has become desynchronized. In the instance that an encoder 114 has become desynchronized, the ingestor 111 can transmit instructions to the desynchronized encoder 112 to re-establish synchronization. In some instances, either or both the ingestor 111 and the encoders 114 may be configured to receive and respond to requests for an authoritative state. For example, when an encoder 114 joins the pool 112, the encoder 114 may be configured to transmit a request for an authoritative state to either or both the ingestor 111 and the other encoders 114 of the pool 112, and to synchronize its own state with the authoritative state.

After encoding the content, each content encoder 114 may provide the encoded content to one or more content packagers 116, which may package the content into a container format accepted by the content distribution systems 120 and/or content output devices 102. The content packagers 116 can then distribute the content to the content distribution systems 120, which may in turn distribute the content to content output devices 102 for decoding and output (e.g., display). Additionally or alternatively, the content streaming system 110 may distribute the content directly to the content output devices 102. The content streaming system 110 may further store the encoded content within the content data store 119 (e.g., for archival purposes, for later transmission to the content distribution systems 120 and/or content output devices 102). The content data store 119 may correspond to any persistent or substantially persistent data storage, such as a hard drive (HDD), a solid state drive (SDD), network attached storage (NAS), a tape drive, or any combination thereof.

Figure 2:
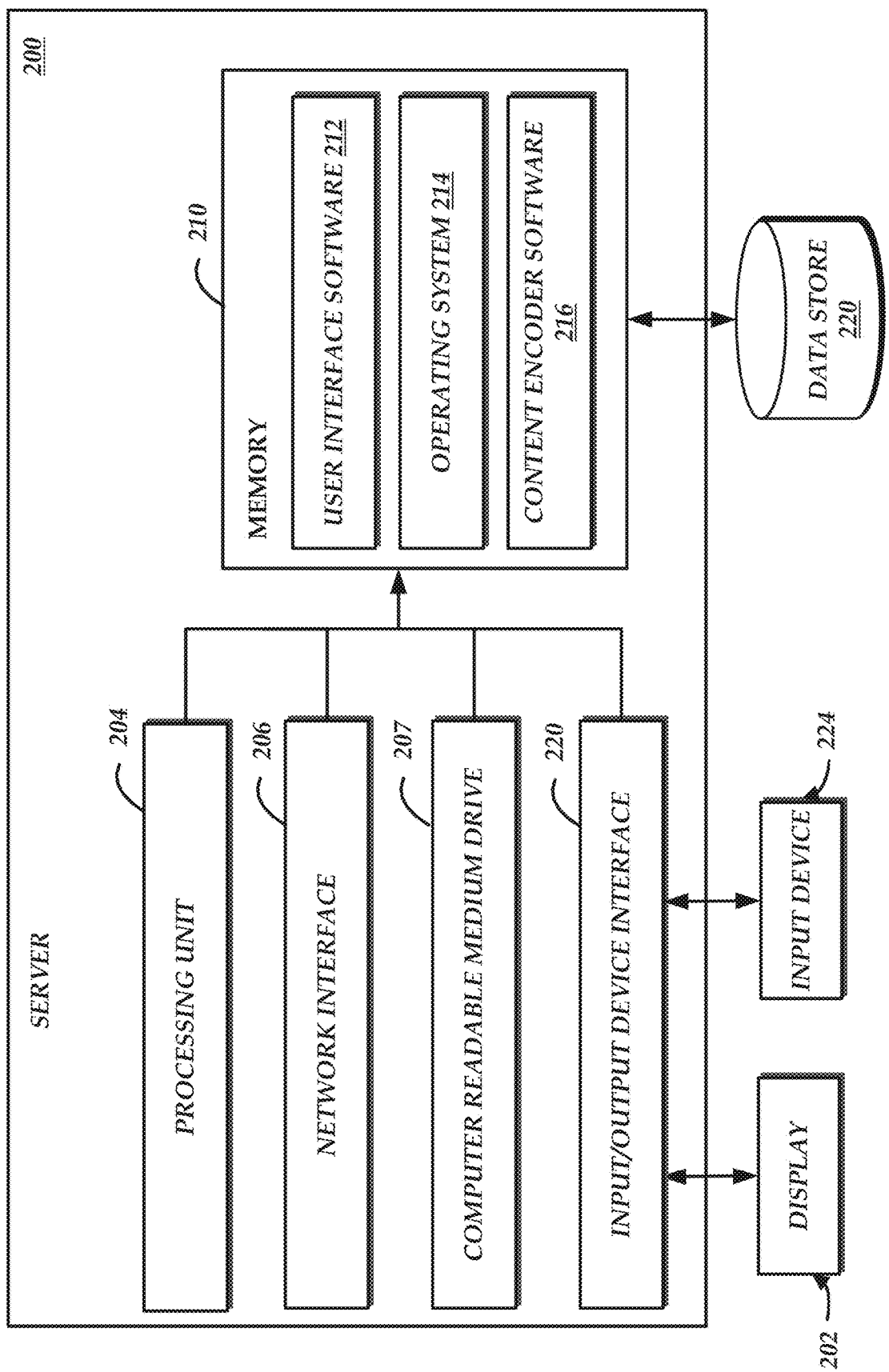
FIG. 2 is a block diagram depicting an illustrative configuration of one embodiment of a server than may implement a content encoder within the content streaming system of FIG. 1, and that may operate to synchronize its encoding state with the state of other content encoders.

It will be appreciated by those skilled in the art that the content streaming system 110 may have fewer or greater components than are illustrated in FIG. 1. In addition, the content streaming system 110 could include various web services or peer-to-peer network configurations. Thus, the depiction of the content streaming system 110 in FIG. 1 should be taken as illustrative. In some embodiments, components of the content streaming system 110, such as the content ingestor 111, the content encoders 114, and the content packagers 116, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment. In other embodiments, components of the content streaming system 110, such as the content ingestor 111, the content encoders 114, and the content packagers 116, may be implemented within an environment of a content provider 104 (e.g., on the premises of a content provider 104). Thus, the configuration shown within FIG. 1 is intended to be illustrative, and not limiting FIG. 2 depicts one embodiment of an architecture of a server 200 that may implement one or more of the content encoders 114 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM, and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 120, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include content encoder software 216 that may be executed by the processing unit 204. In one embodiment, the content encoder software 216 implements various aspects of the present disclosure, e.g., encoding content obtained from a content ingestor 111, while utilizing a synchronization protocol to ensure synchronization with other content encoders 114 While the content encoder software 216 is shown in FIG. 2 as part of the server 200, in other embodiments, all or a portion of the software may be implemented by alternative computing devices within the content streaming system 110, such as virtual computing devices within a hosted computing environment. Moreover, while FIG. 2 is described with respect to a content encoder 114, the software within the memory 210 may additionally or alternatively include instructions to implement other components of the present disclosure, such as the content ingestor 111.

Figure 3A:
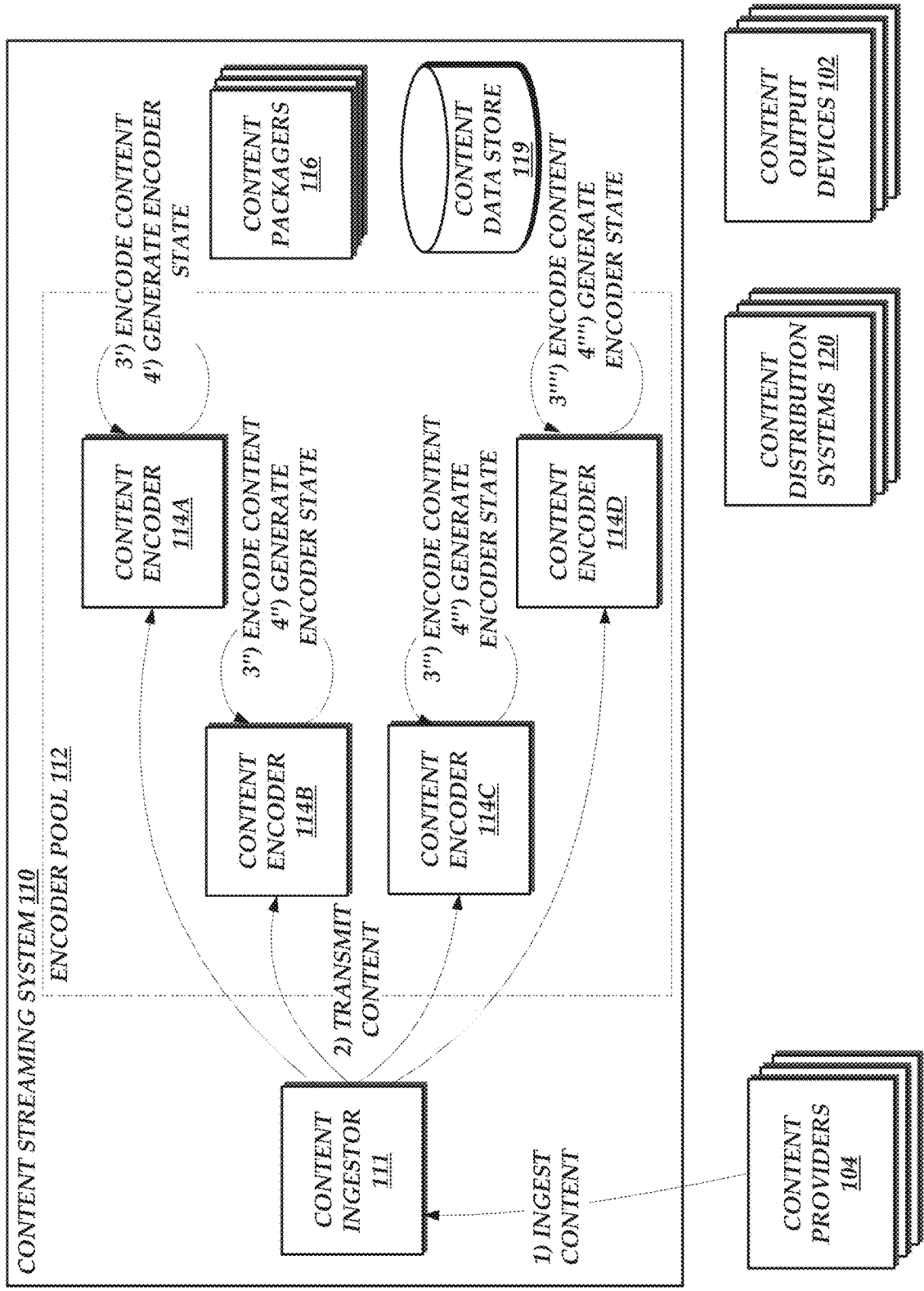
FIGS. 3A-3C are block diagrams depicting illustrative interactions of the content streaming system of FIG. 1 to provide encoded and packaged streaming content by use of multiple redundant or cooperative encoders synchronized according to a synchronization protocol.
Figure 3B:
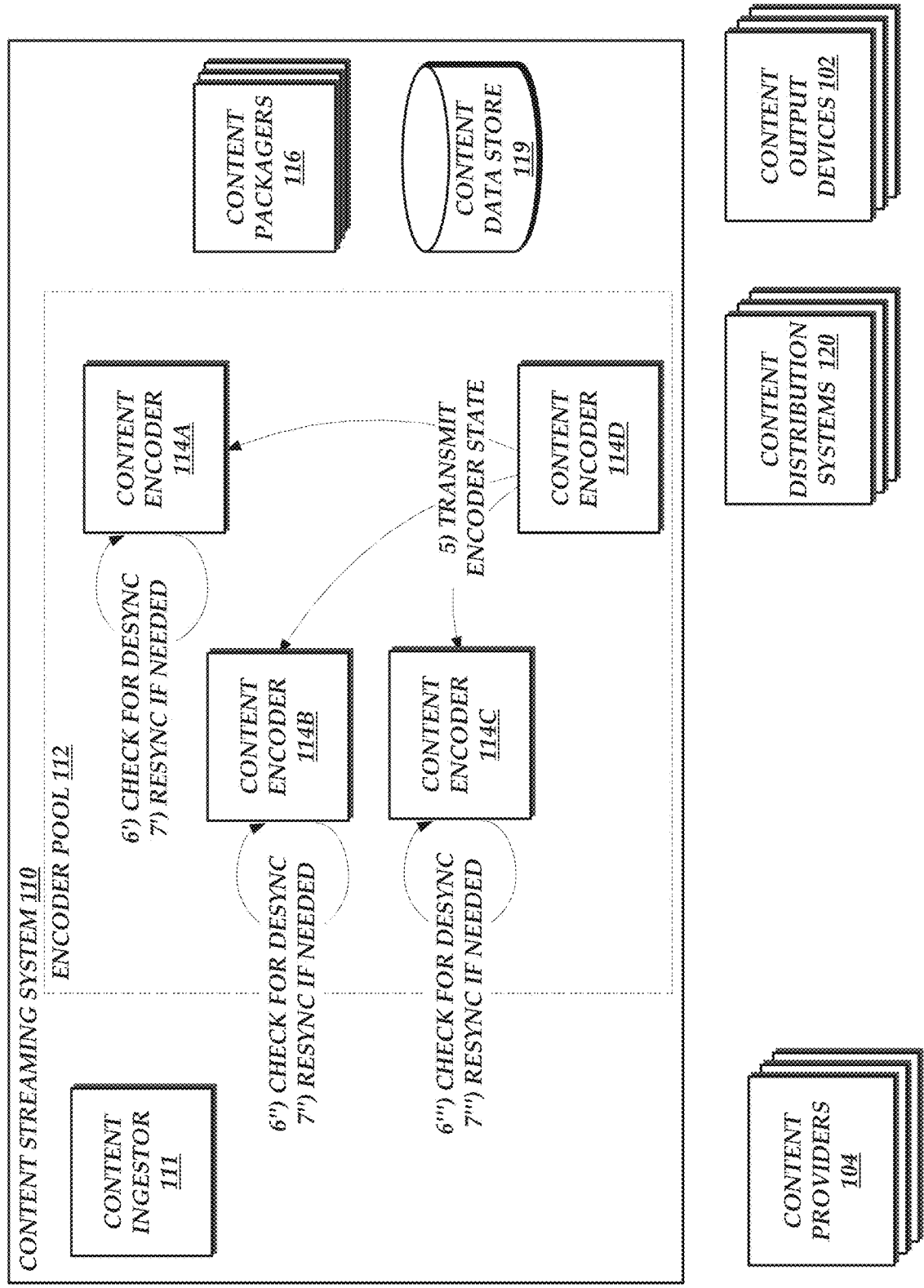
Figure 3C:
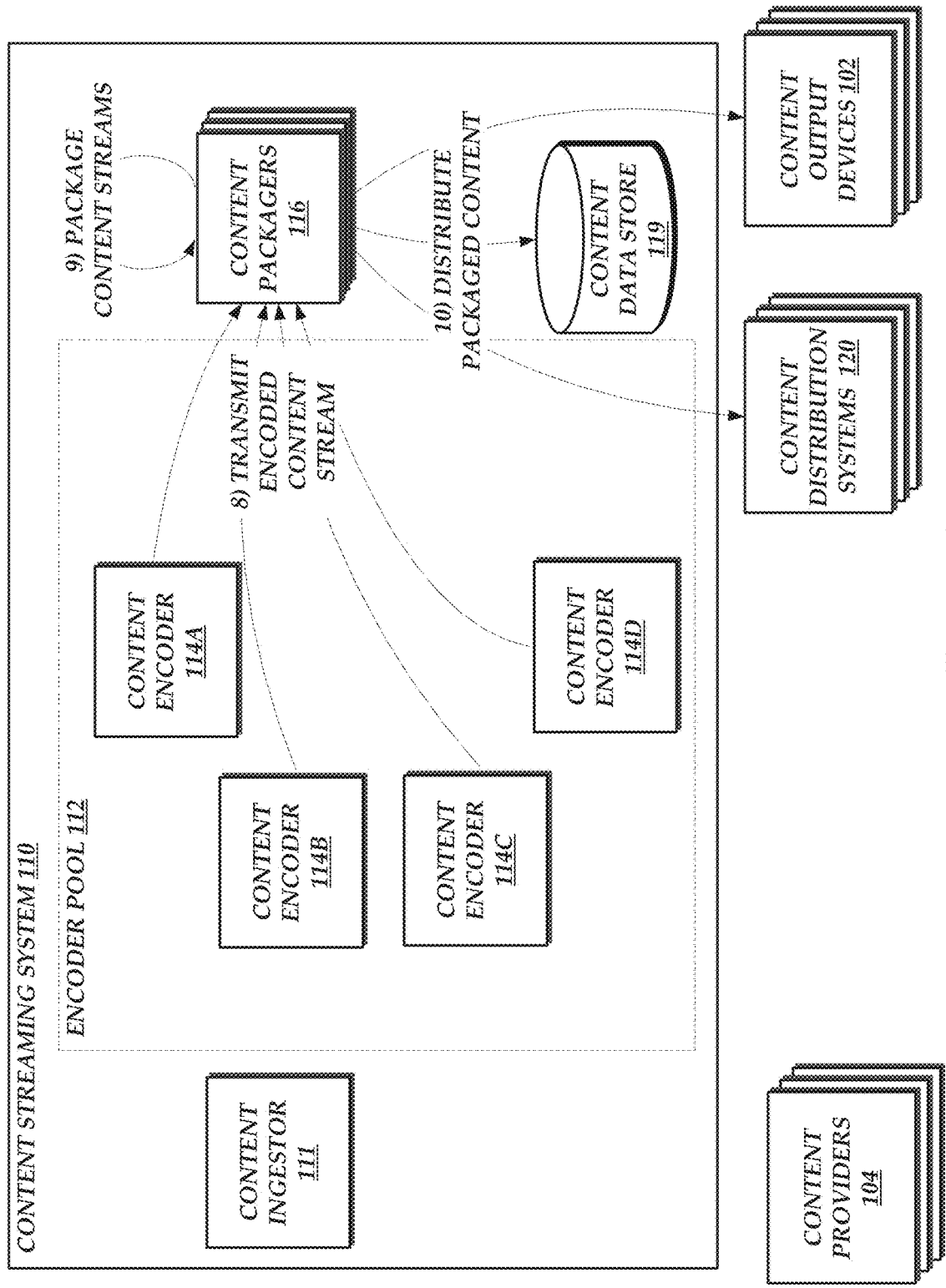

With reference to FIGS. 3A through 3C, a set of illustrative interactions for synchronized encoding of streaming content by four encoders, labeled content encoders 114A through 114D, will be described. While the interactions of FIGS. 3A through 3C will be described with respect to four content encoder 114, the interactions may be similarly applied to any number of encoders. For the purposes of FIGS. 3A through 3C, a scenario will be described in which all content encoders begin to encode content in a synchronized manner, but in which a portion of the content stream transmitted to a single encoder, encoder 114C, is lost (e.g., due to malfunction with a network, such as dropped packets). As will be described below, the interactions of FIGS. 3A through 3C enable the encoder 114C to resynchronize with the other encoders 114 of the pool 112, even after loss of a portion of the content stream (which may not have been experienced at the other encoders 114 of the pool 112). Illustratively, the various encoders 114A-D may provide enable either redundant or distributed content encoding within the content streaming system 110. For example, encoders 114A and 114B may be configured to encode content according to a first set of parameters (e.g., at 4K resolution and 60 frames per second), while encoders 114C and 114D are configured to encode the same content according to a second set of parameters (e.g., at 1080p resolution and 30 frames per second). In some embodiments, an individual encoder 114 may be configured to encode multiple versions (or "renditions") of content. For example, encoders 114C and 114D may, in addition to encoding the content according to the second set of parameters, also be configured to each encode the content according to a third set of parameters (e.g., at 480i resolution and 30 frames per second). Thus, any combination of encoders may be used to encode any combination of versions of a content item, with each encoder providing one or more redundant or cooperative encoded content streams.

In such an arrangement, it is desirable within the content streaming system 110 for the content output from the content encoders 114A-D to be identical or interchangeable. However, at least some aspects of content output by the encoders 114 may be dependent on the state of those encoders. For example, encoded video content often uses segments (such as GOPs) to encode video. Each group of pictures can consist of at least one "independent frame," and one or more "dependent frames." Each independent frame may be coded without respect to other frames of the video, such that decoding the independent frame does not depend on other frames within the video. Each dependent frame may be encoded based at least partly on other (e.g., previous) frames, such that decoding the dependent frame requires information of the other frames. Generally, the arrangement of groups of pictures within encoded content (and thus the arrangement of independent or dependent frames) is determined by the encoder, independent of the content being input. If encoders 114A-D begin encoding the received content stream simultaneously, the placement of groups of pictures within the output content stream can be expected to be the same, and thus, the content streams will be interchangeable. However, if one encoder 114, such as encoder 114C, does not receive some frames of the content, then it's GOP alignment may deviate from the other encoders 114 (e.g., such that the frames lost at the encoder 114C are included in given GOP at the other encoders 114, while the encoder 114C instead includes in a corresponding GOP those frames occurring immediately after the lost frames). This may result in non-interchangeable content streams, since arrangement of independent or dependent frames varies between the streams. In addition to GOP arrangement, timestamp values of an encoder may be based on a state of the encoder. For example, an encoder may be configured with a "base" timestamp of 0, such that timestamps within content output by the encoder begin at 0 and increment proportionally to timecodes within the content (e.g., at a proportion of 10 million timestamps for every one second of content). The timestamps within a content may be utilized by a content packager 116 to determine which content to include within packaged content. For example, where two segments of video data with the same timestamp value are obtained by a content packager 116, the content packager 116 may assume that the segments contain the same video content. Thus, it is desirable for each content encoder 114 to maintain identical timestamp values for encoded content. However, where frames are lost at an encoder 114, or whether other events occur to desynchronize encoders 114, the timestamps assigned to corresponding content may differ, resulting in non-interchangeable content. The interactions of FIG. 3A address these deficiencies, by enabling synchronization of the encoders 114 within the pool 112.

The interactions of FIG. 3A begin at (1), where the content ingestor 111 receives content from a content provider 104. Illustratively, the content ingestor 111 may receive content from content providers 104 over the network 106 (e.g., via a user datagram protocol, or "UDP," stream). In other embodiments, the content ingest 112 may receive content directly from a capture device (e.g., a digital video recorder connected to the content ingestor 111 via a serial digital interface ("SDI")). As noted above, the content provided to the content ingestor 111 may be in "raw," uncompressed or analog format, or in a format that is otherwise required to be "encoded" prior to delivery to the content output devices 102. Thus, at (2), the content ingestor 111 passes the content as a stream to the encoders 114 of the encoder pool 112, which begin encoding content at (3') through (3''''). Illustratively, the encoder 114A may encode the obtained content into any number of known formats, including but not limited to H.263, H.264, H.265, MICROSOFT SMPTE 421M (also known as VC-1), APPLE™ ProRes, APPLE Intermediate Codec, VP3 through 9, Motion JPEG ("M-JPEG"), MPEG-2 part 2, RealVideo, Dirac, Theora, and MPEG-4 Part 2 (for video), and Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), and RealAudio (for audio), or combinations thereof. Various techniques for encoding content are known within the art, and therefore will not be described in greater detail herein. While it is assumed for the purposes of description of FIG. 3A that each of the encoders 114A-D begin encoding the content stream at the same time, this is not required. Rather, where an encoder 114 begins encoding at a later point in time than other encoders 114, that encoder 114 may establish synchronization with the other encoders 114 via the mechanisms described herein (e.g., by waiting for state information to be received from other encoders 114 or a centralized controller, or by actively polling other encoders 114 or the centralized controller for that state information).

During encoder, at (4') through (4""), each encoder 114 generates encoder state information regarding the state of its encoding. Illustratively, each encoder 114 may be configured to generate state information periodically, such as every n seconds or frames during encoding. The encoder state information can include any information required by the synchronization processes of the content encoder 114B, as described below. One illustrative example of the content of state information is shown below with reference to TABLE 1.

TABLE 1

| Output ID | Input Timecode | Output Timestamp | GOP No. | Elapsed Frames |
|---|---|---|---|---|
| HD-Stream | 1:12:03; 20 | 0 | 1 | 0 |
| HD-Stream | 1:12:05; 05 | 15000000 | 2 | 45 |
| HD-Stream | 1:12:06; 20 | 30000000 | 3 | 90 |

As shown in TABLE 1, the state information can include a mapping of input timecodes (e.g., as included with the input content stream at each encoder 112) with corresponding output timestamps (e.g., as associated with output by an individual encoder 112) and GOP numbers. In the example of TABLE 1, a single stream ("HD-Stream") is assumed, with a GOP size of 45 frames, a frame rate of 30 frames per second, and a timestamp beginning at zero and incrementing 10 million values per second. One of skill in the art will appreciate that other GOP sizes, frame rates, base timestamps, and timestamp increment rates can be utilized. In some instances, information for multiple streams may be included in the state information (e.g., for streams at different resolutions). The state information of TABLE 1 includes only information regarding video, since audio information may not be required in instances, for example, where audio segmentation boundaries are defined according to corresponding video segmentation boundaries. Illustratively, where different audio encoding parameters are utilized, such as different sampling rates or different frame sizes, it may be difficult or impossible to align audio segmentation boundaries. However, by creating audio segmentation boundaries with reference to corresponding video segmentation boundaries, different versions of a content stream can nevertheless be made seamlessly interchangeable (e.g., with minimal disruption to audio). In other embodiments, the state information may alternatively or additionally include information regarding a state of audio inputs and outputs.

In one embodiment, the state information is historical, reflecting timecodes, timestamps, and GOP numbers already output by an encoder 114. In another embodiment, the state information is forward-looking, or a combination of historical and forward-looking, and includes at least one timecode, timestamp, and GOP mapping that has not yet been encoded by the encoder 114. In some instances, the state information may include other information regarding the encoder 114 or a stream, such as the parameters under which the encoder 114 is operating, or parameters specific to a stream (e.g., frames per second of the stream, resolution, etc.). Assuming that the information in TABLE 1 stems from a first encoder 114A, another encoder 114 can verify synchronization with the encoder 114A using the information in the stream. Specifically, in this example, if an encoder 114 has (or will) apply the same output timestamp and GOP number to content at a given input timecode, then the encoder 114 is expected to produce content interchangeable with that produced by encoder 114A.

The above-discussed interactions continue in FIG. 3B, where the previously generated state information at an encoder 114 is, at (5), transmitted to other encoders 114 in the pool 112. For ease of illustration and description, transmission of state information is shown from only a single encoder 114, encoder 114D. However, each encoder 114 may transmit its information to each other encoder 114 in a similar manner. In one embodiment, the content encoder 114D transmits the state information to the other encoders 114 of the pool 112 by using a multicast transmission. In another embodiment, the encoder 114D transmits state information to other encoders 114 directly, or by use of a messaging service (not shown in FIG. 3B) configured to either "push" messages to the encoders 114 of the pool 112 or allow the encoders 114 to periodically "pull" messages from the service.

At (6), and after receiving the state information from content encoder 114D, each other content encoder 114A-C determines whether the state information indicates that a desynchronization has occurred. Desynchronizations can occur for a variety of reasons, such as loss of data in transmission to one but not all encoders 114, errors in operation of the encoder 114 (e.g., due to an overtaxed central processing unit, or "CPU"), crashes, software problems, etc. Illustratively, a content encoder 114 can determine that it has become desynchronized when received state information does not match its own state (e.g., where received state information indicates that another encoder 114 has applied a different GOP number or timestamp to the same input timecode), and when the encoder 114 determines that the received state information is more authoritative than its own state. As used herein, authoritative state information generally refers to state information that is "correct," and thus should be adopted by the encoders 114 of the pool 112. Each encoder 114 may be configured to identify authoritative state information in the same manner, such that under the same conditions, each encoder 114 will identify the same state information as authoritative. Any number of consistency-ensuring protocols can be utilized to identify authoritative information and ensure consistency among the pool 112. For example, each encoder 114 may be configured to identify the "oldest" state information—applying the earliest timestamp or largest GOP number to a given timecode—as authoritative. In another embodiment, the encoders 114 may utilize a quorum protocol, such that the state information shared by at least a quorum (e.g., more than half) of the encoders 114 is determined to be authoritative.

If an encoder 114 has become desynchronized, the encoder 114 can utilize the authoritative state information in order to resynchronize its content output. Illustratively, a content encoder 114 can utilize the authoritative state information to determine segmentation boundaries for its own encoded content, and to use those segmentation boundaries for the content. With respect to video, segmentation boundaries can designate the alignment of GOPs within a video stream. The size of each GOP is generally dependent on the configuration of an encoder, and the output of identical or interchangeable content can be dependent on use of the same segmentation boundaries. By utilizing the authoritative state information, an encoder 114 can determine where a next GOP segment should begin.

In embodiments where the state information includes forward-looking data, and at least one timecode of the state information is larger than a "latest" timecode seen at the encoder 114, that encoder can resynchronize itself by adopting the values associated with that timecode. For example, if encoder 114C has detected a desynchronization at timecode "1:12:06; 00" (one hour, twelve minutes, six seconds, and zero frames), and the state information indicates that timecode "1:12:06; 20" (one hour, twelve minutes, six seconds, and 20 frames) corresponds to a timestamp of 30 million, and a GOP number of 3, the encoder 114C can begin a new GOP at the timecode "1:12:06; 20," and assign that GOP a GOP number of 3, and frames within the GOP timestamps beginning with 30 million.

In embodiments where the state information does not include forward-looking data, or where the state information otherwise includes data older than a current timecode of a desynchronized encoder 114, the encoder can nevertheless use the state information to reestablish synchronization. Illustratively, the desynchronized content encoder 114 may calculate from the state information a next video frame at which the to begin a GOP according to the equation:

$$\text{NextGOPFrame} = \text{Timecode}_n + \text{GOPSize} - ((\text{Timecode}_n - \text{Timecode}_i) \bmod \text{GOPSize})$$

where:

NextGOPFrame represents the next timecode at which a GOP would begin;

$\text{Timecode}_n$ represents any timecode within a video (e.g., the current timecode of the desynchronized encoder 114);

$\text{Timecode}_i$ represents a timecode at which a GOP is known to have begun (e.g., the latest timecode indicated within the authoritative state information as corresponding to a GOP); and GOPSize represents the number of frames within a GOP. Note that this equation assumes that $\text{Timecode}_n$ is not equal to a timecode at which a GOP would begin. In the instance that $\text{Timecode}_n$ represents a timecode at which a GOP would begin (e.g., $(\text{Timecode}_n - \text{Timecode}_i) \bmod \text{GOPSize} = 0$), then NextGOPFrame equals $\text{Timecode}_n$. Further, this equation assumes that the operations, such as addition, occur with appropriate conversions between different units, such as timecodes and frames, based on relationships between those units (e.g., 30 frames per second).

After determining a frame corresponding to a next GOP, the encoder 114 may then "force" creation of a new GOP at the expected frame in order to achieve resynchronization. For example, the encoder 114 can force insertion of a new independent frame at the expected frame, thus beginning a new GOP. This may cause a prior GOP to have fewer than the expected number of frames, but will ensure that future GOPs align with those of other encoders 114 in the pool 112.

The desynchronized content encoder 114 may additionally determine synchronized segmentation boundaries for audio content. Audio may generally be represented as samples over time (e.g., 48000 samples per second, or a sampling rate of 48 kilohertz ("KHz")). Audio samples can be grouped together within content according to "frames." For example, in the AAC format, frames contain 1024 samples (e.g., at a sample rate of 48 KHz, there would be a frame rate of 46.875 frames of audio per second). These frames are further grouped into audio segments. In some instances, the length of an audio segment is static (e.g., occurring every n seconds). In other instances, the length of an audio segment is dynamic (e.g., occurring once per video GOP, with variance to enable a segment to contain only complete frames). In either instance, the sample count associated with the first audio segment output by a previously desynchronized content encoder 114 can be calculated as:

$$\text{elapsed samples} = \text{time encoded} * \text{sample rate}$$

where:

elapsed samples is the number of samples elapsed at another encoder within the pool 112 (e.g., as indicated within authoritative state information), which can be utilized as an initial sample count by the previously desynchronized content encoder 114;

time encoded is the amount of content encoded by another encoder within the pool 112 (e.g., as indicated within authoritative state information, and measured with respect to timestamp, timecode, a number of elapsed frames, etc.);

sample rate is the number of samples per time unit (e.g., second) in the content stream. Note that an implication of using static length audio segments is that the first audio segment emitted by a previously desynchronized encoder 114 may be shorter than subsequent audio segments (e.g., because the previously desynchronized encoder 114 begins encoding in the middle of an audio segment emitted by other encoders 114 within the pool 112). Similarly, where video segmentation is used and the content stream duration is not evenly divisible by the video segmentation length, use of segmented encoding may result in at least one segment, such as the final segment, that is shorter than an expected length. In some instances, shorter than expected segments can disrupt functionality of a packager 116 or output device 102, and the encoders 114 may be configured to either not create or not transmit shorter than expected segments.

In the instance that fixed audio segments are utilized, an encoder 114 can determine locations within the stream that correspond to each segment by calculating the number of samples within a segment (e.g., by multiplying the number of samples in a frame by the number of frames within a segment), and beginning a new segment at each interval of that value (e.g., such that if a current sample count modulo the number of samples in a segment equals zero, the sample begins a new segment). In the instance that dynamic audio segments are utilized by the encoders 114 (e.g., such that audio segments start at the first complete frame after a video segmentation boundary), an encoder 114 can determine locations within the stream that correspond to each segment by calculating the number of samples within a frame (e.g., 1024), and beginning a new segment at the first complete frame following the beginning of a video segment (e.g., such that if a current sample count modulo the number of samples in a frame equals zero, the sample begins a new segment).

In addition, a desynchronized encoder can calculate a synchronized timestamp for a corresponding timecode based on the authoritative state information. Generally, timestamps begin at a base value (e.g., zero), and increment at a set rate (e.g., 10 million increments per second, or 10 megahertz ("MHz")). Accordingly, by knowledge of an authoritative timecode to timestamp mapping, an encoder 114 can calculate an expected timestamp for any given timecode. Specifically, the encoder 114 can determine an authoritative number of elapsed frames for any given timecode (e.g., as indicated in the state information, or calculated based on the frame counts included within the state information), and that number of frames to calculate an expected timestamps for any given timecode. For example, the timestamp for any given frame could be calculated as:

$$\text{timestamp} = \frac{ElapsedFrames}{FPS} * \text{timestamp\_resolution}$$

where:

ElapsedFrames represents an authoritative number of elapsed frames for any given timecode, which may be directly indicated within the state information or calculated based on the state information;

FPS represents the frames per second of the video; and timestamp_resolution represents the number timestamps to elapse per second.

Similarly, the timestamp for any given audio sample could be calculated as:

$$\text{timestamp} = \frac{ElapsedSamples}{SampleRate} * \text{timestamp\_resolution}$$

where:

ElapsedFrames represents an authoritative number of elapsed samples for any given timecode, which may be directly indicated within the state information or calculated based on the state information;

SampleRate represents the samples per second of the audio; and timestamp_resolution represents the number timestamps to elapse per second.

The encoder 114 can thereafter apply the calculated timestamps to encoded content that is output, thereby ensuring synchronization with the pool 112.

Additionally, the encoder 114B may synchronize its audio sample count value to that of the authoritative state information. Specifically, the encoder 114 can calculate how many audio frames will have elapsed between a point in time at which the encoder 114 generating the authoritative state information began encoding, and a point in time at which the encoder 114 itself will begin encoding, and initialize its sample count based on that value. The number of audio frames elapsed for any given duration of time may be calculated as the duration of time multiplied by the frames per second (e.g., at 48 KHz and 1024 samples per frame, 46.875 frames per second). The sample count for encoder 114 can then be initialized as the number of audio frames elapsed multiplied by the samples per frame.

Thus, by utilizing the state information, a desynchronized encoder 114 can resynchronize its output with the remaining encoders 114 within the pool 112, ensuring output of interchangeable encoded content.

While the interactions of FIGS. 3A through 3C are described under conditions in which an encoder 114 begins in a synchronized state, but later becomes desynchronized, the same or similar interactions may be utilized to enable an encoder 114 to conduct an initial synchronization (e.g., when the encoder 114 begins encoding content at a later time than other encoders 114 of the pool 112). For example, when an encoder 114 receives instructions to begin encoding a content stream, the encoder 114 may delay that encoding until state information is received from one or more other encoders 114. The encoder 114 may then determine authoritative state information, and synchronize its own state in the manner described above. An encoder 114 may passively await state information, by waiting until the other encoders 114 initiate transmission of the state information, or may actively solicit state information in the instance that the other encoders 114 are configured to receive and respond to requests for state information.

The above-discussed interactions continue in FIG. 3C, where the encoders 114 within the pool 112 transmit their encoded content to the content packagers 116. Thereafter, at (9), the content packagers 116 may package the content into a container format accepted by the content distribution systems 120 and/or content output devices 102. As will be recognized by one of skill in the art, a container format may generally combine encoded audio and video into a file, potentially along with synchronization information for the audio and video, subtitles, metadata, or other information. Examples of containers include, but are not limited to, Matroska, FLV, MPEG-4 Part 12, VOB, Ogg, Audio Video Interleave ("AVI"), Quicktime, Advanced Systems Format ("ASF"), RealMedia, and MPEG Transport Stream ("MPEG-TS"). In some instances, containers may include exclusively audio or exclusively video, rather than a combination of the two. In one embodiment, content packagers 116 may package the content into multiple container files, such as multiple transport stream files, and generate additional information enabling distribution systems 120 and/or content output devices 102 to distribute or consume the packaged content. For example, the content packagers 116 may package the encoded content according to streaming protocols, such as Hypertext Transport Protocol ("HTTP") Live Streaming ("HLS") or MPEG Dynamic Adaptive Streaming over HTTP ("MPEG-DASH"), and generate metadata regarding the encoded content, such as manifest file identifying each package of encoded content.

After packaging the encoded content, the content packagers 116, at (10), distribute the content to one or more of the content output devices 102, the content distribution systems 120 (which may in turn distribute the content to content output devices 102 for decoding and output), and the content data store 119 (e.g., for archival purposes, for later transmission to the content distribution systems 120 and/or content output devices 102).

While the interactions of FIGS. 3A through 3C are described above sequentially, it is contemplated that some or all of the interactions may repeatedly occur, and that these interactions may occur at least in part concurrently. For example, content encoders 114A D may continue to receive and encode content during interactions (4)-(7). While timestamp synchronization is described above with respect to a frame offset, other offset types may additionally or alternatively be utilized by an encoder 114. For example, rather than determine a frame offset, an encoder 114 may determine a timestamp for any given timecode directly, according to the equation $$timestam = \frac{timecode - timecode_a}{FPS} * timestamp_{resolution} + timestamp_a$$

where:

$timecode_a$ refers to an timecode within authoritative state information; and $timestamp_a$ refers to a timestamp corresponding to timecode$_a$.

However, in some instances, minor differences may exist between the timestamp of the encoder 114 to be synchronized and the encoder 114 that generated the authoritative state information, because the use of division within the equation above may result in "off by one" errors in instances where timestamps are represented as integer values. The use of a frame offset can prevent such errors, and therefore may be preferable.

While the equations and description above generally discusses frames of content, other units may additionally or alternatively be used. For example, where video content is interlaced, the equations above may be calculated with respect to video fields, rather than video frames. Moreover, while the equations and description above generally discuss groups of pictures (GOPs) and video segments as synonymous, this may not be true for all embodiments. For example, some embodiments may utilize multi-GOP video segments. In such embodiments, references to "GOPs" in the description or equations above can be understood to refer to "video segments." Still further, while the equations and description above generally discuss the use of timecodes associated with an input content stream to synchronize encoding between multiple encoders 114, additional or alternative input values may be used. For example, encoders 114 may utilize input timestamps to synchronize encoding of content, by providing information regarding input timestamps within the state information exchanged between encoders 114. Illustratively, such state information may include a mapping of input timestamps to output timestamps, and each encoder 114 may compare the information of received state information to its own state, to determine whether a synchronization has occurred and an authoritative state to use for resynchronization.

In some embodiments, encoders 114 may be configured to transmit state information in response to detecting an anomaly in that information. These transmissions may occur either in addition to or alternatively from transmitting state information periodically. Illustratively, an encoder 114 might detect an anomaly in state information by comparing actual encoding values to those expected (e.g., based on the algorithms above). For example, where an encoder is configured to associate sequential output timestamp values with corresponding input timecodes or timestamps, an increase in input timecode would be expected to proportionally matched with an increase in an output timestamp. However, dropped input frames may cause the input timecodes to advance more rapidly than corresponding, sequentially applied output timestamps. As such, the encoder may detect an anomaly when a prior input timecode to output timestamp mapping does not match values expected based on the algorithms above. Anomalies may also be detected based on other inputs, such as input timestamps, not matching expected values for corresponding outputs values. Similarly, an encoder may detect that a segmentation boundary appears at unexpected location (e.g., due to dropped frames, instructs to force insert a boundary by the content ingestor 111 or other component, etc.), as determined from the algorithms above, and flag the unexpected location as indicative of an anomaly. When an anomaly is detected, the encoder 114 can transmit state information to other encoders 114, which may utilize the state information to resynchronize, if necessary. In some instances, when an anomaly is detected, an encoder 114 may request state information from other encoders 114, in order to determine whether the state of the encoder 114 after the detected anomaly matches an authoritative state of the pool 112.

Figure 4A:
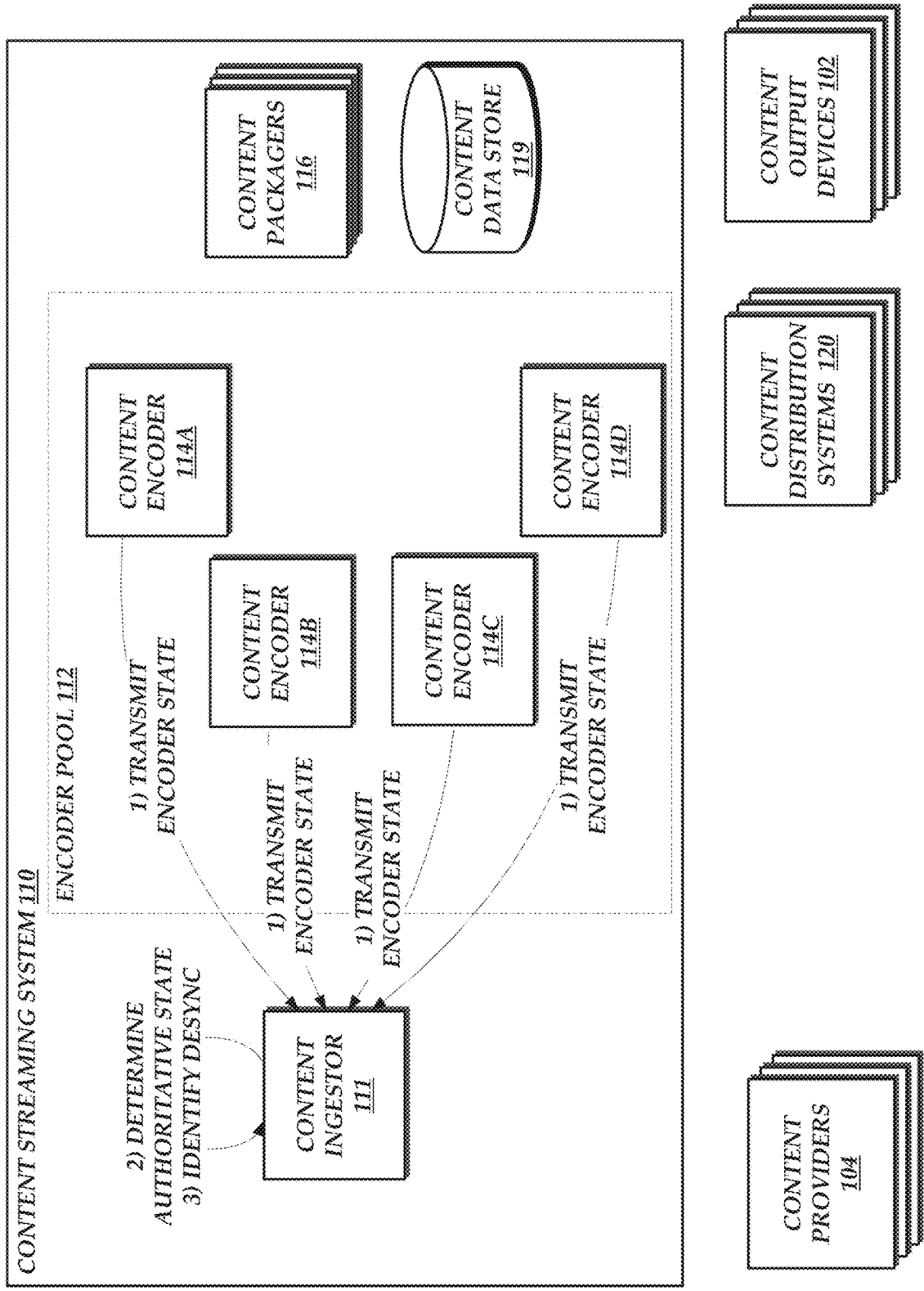
FIGS. 4A and 4B are block diagrams depicting illustrative interactions of the content streaming system of FIG. 1 to enable a centralized control, such as a content ingestor, to coordinate synchronization of content encoders.
Figure 4B:
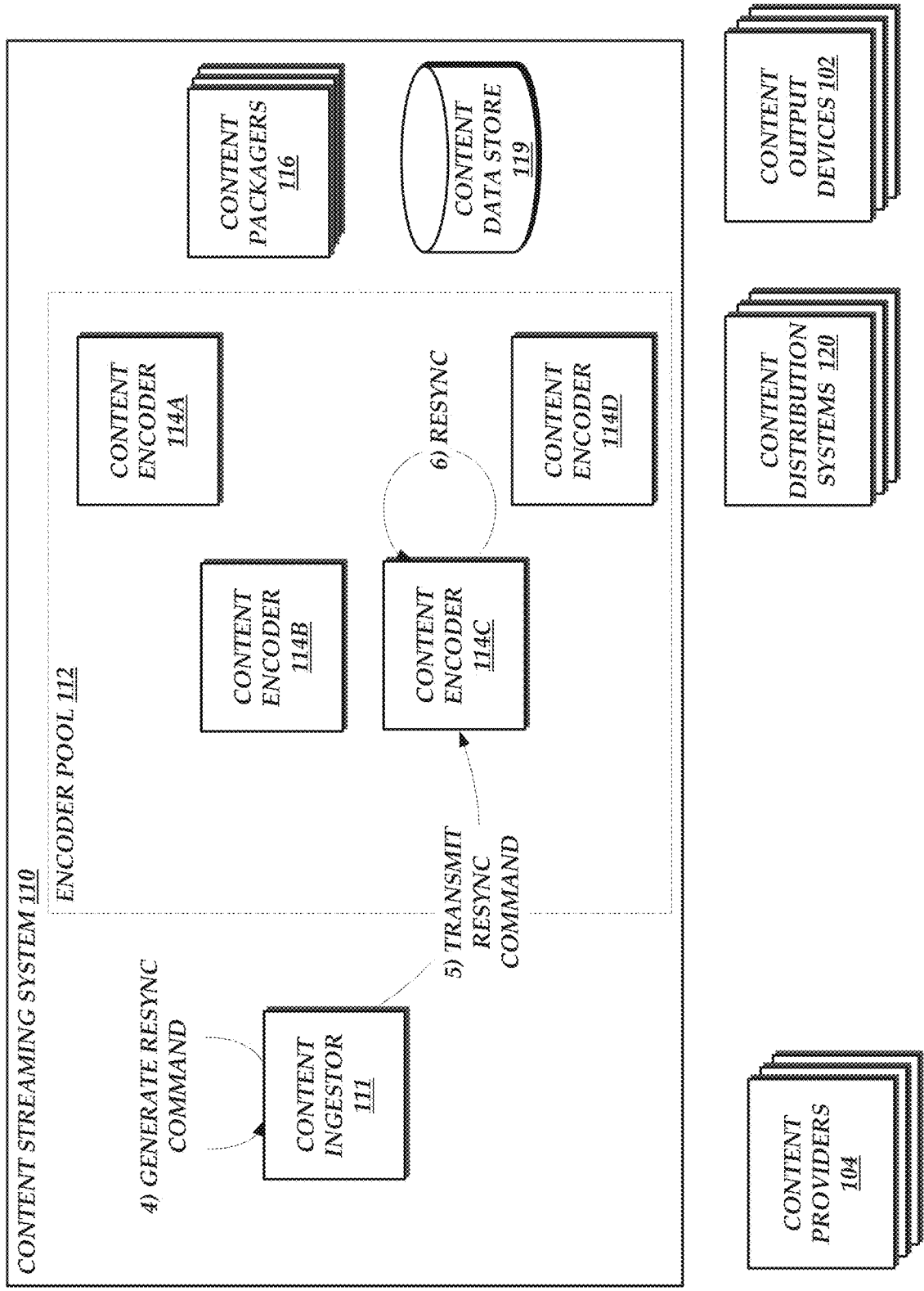

With reference to FIGS. 4A and 4B, a set of interactions is shown that may be implemented additionally or in the alternative to the interactions of FIG. 3A through 3C. Specifically, while the interactions of FIG. 3A through 3C describe embodiments in which an individual content encoder 114 is configured to transmit state information, and utilize received state information to determine if it has become desynchronized (embodiments which may be described as "peer-to-peer"), the present disclosure also contemplates the use of a centralized controller to detect desynchronizations, determine authoritative state information, and instruct encoders 114 to resynchronize. In FIGS. 4A and 4B, the content ingestor 111 illustratively acts as the centralized controller. However, other components (such as a single content encoder 114) may also act as a centralized controller. In some instances, more than one component (e.g., multiple ingestors 111 or multiple encoders 114) may act in coordination as a centralized controller.

For ease of description, the interactions of FIGS. 4A and 4B are described under the assumption that the pool 112 of encoders 114A through 114D is actively encoding content provided by the ingestor 111, and a desynchronization has occurred on one or more encoders 114 of the pool 112. However, as will be described below, the ingestor 111 may additionally or alternatively be configured to facilitate an initial synchronization of encoders 114, such as when a first encoder 114 has begun encoding, and one or more additional encoders 114 should begin encoding in a synchronized state.

The interactions of FIG. 4A begins at (1), where each content encoder 114 of the pool 112 transmits state information to the content ingestor 111. Illustratively, each encoder 114 may be configured to generate state information periodically, such as every n seconds or frames during encoding.

Thereafter, at (2), the content ingestor 111 can determine authoritative state information for the pool 112. Similarly to as noted above with respect to FIGS. 3A through 3C, any number of consistency-ensuring protocols can be utilized to identify authoritative information and ensure consistency among the pool 112. For example, the content ingestor 111 may be configured to identify the "oldest" state information—applying the earliest timestamp or largest GOP number to a given timecode—as authoritative. In another embodiment, the content ingestor 111 can utilize a quorum protocol, such that the state information shared by at least a quorum (e.g., more than half) of the encoders 114 is determined to be authoritative.

At (3), the content ingestor 111 can determine whether any encoder 114 of the pool 112 has become desynchronized. As noted above, desynchronization can refer to a situation in which the state information of an encoder 114 does not match or correspond to the authoritative state information, as may occur when frames have been dropped by or not received at the encoder 114. For the purposes of description of FIGS. 4A and 4B, it will be assumed that a desynchronization has occurred on content encoder 114C. Accordingly, the interactions of FIG. 4A continue on FIG. 4B, where the content ingestor 111 generates a resynchronization command. The resynchronization command can generally include instructions to the encoder 114C to resynchronize to the pool 112, as well as information enabling that resynchronization. In one embodiment, the information enabling resynchronization is the authoritative state information. In another embodiment, the information enabling resynchronization is a set of correct output values for the encoder 114C calculated by the content ingestor 111 according to the formulas provided above, such that the encoder 114C is not itself required to conduct the calculations. In some instances, the resynchronization command may further include a timecode at which the content encoder 114C is to resynchronize.

At (5), the content ingestor 111 transmits the resynchronization command to the content encoder 114C, which, at (6), uses the information within the command to resynchronize its output with the outputs of other encoders 114 in the pool. Thus, the content ingestor 111 can act as a centralized controller to ensure that the encoders 114 within the pool 112 provide identical or interchangeable outputs.

As noted above, in addition to or as an alternative to transmitting state information periodically, encoders 114 may be configured to transmit state information in response to detecting an anomaly in that information, such as an unexpected mapping of input to output values or unexpected segmentation boundary locations. In embodiments where a central controller is used, the encoder 114 may transmit its state information to the central controller on detection of an anomaly, and the central controller may act to determine whether that state information is authoritative. If so, the controller can propagate the state information to relevant encoders 114 (e.g., those that the controller believes have a state other than the authoritative state). If not, the controller can transmit instructions to the encoder 114 that detected the anomaly to resynchronize to the encoder pool 112. Because the controller can maintain the state of each encoder 114 in the pool 112, it may be unnecessary for the encoders 114 to transmit state information, other than in instances of detected anomalies. The reduction in network communications may improve the efficiency of the system.

Figure 5A:
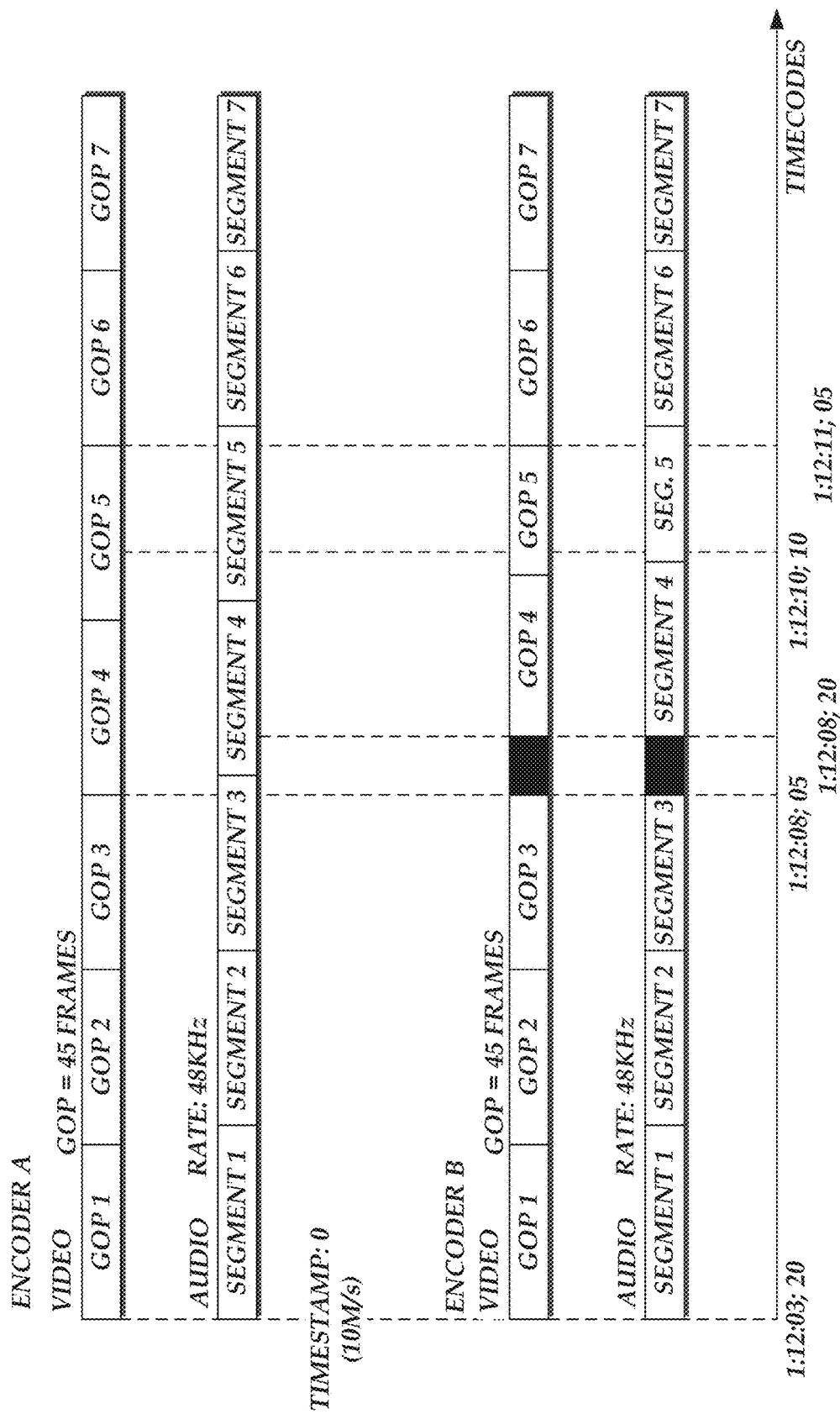
FIGS. 5A and 5B are illustrative visualizations of content encoded by a first and second encoder before and after synchronization.
Figure 5B:
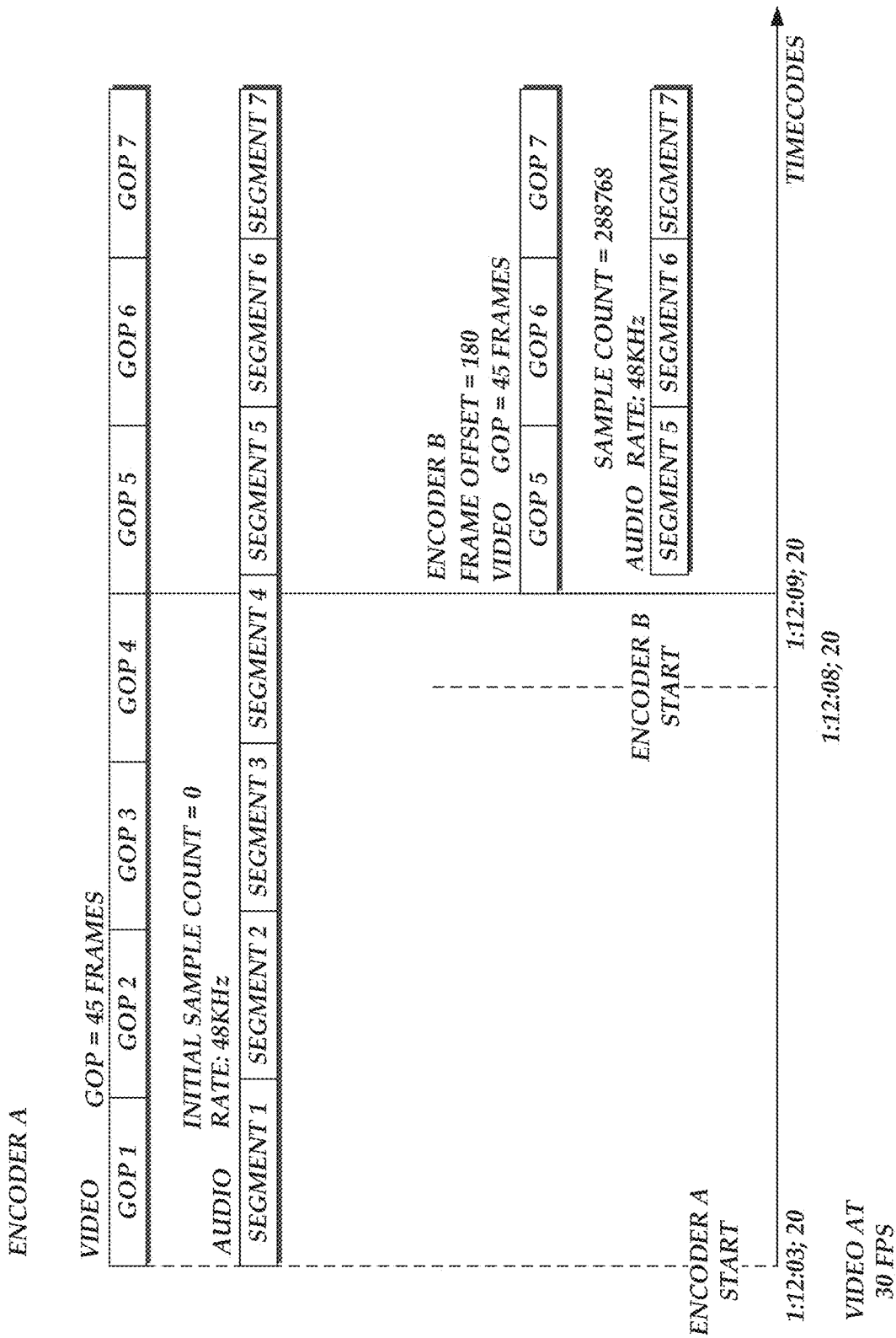

With reference to FIGS. 5A and 5B, illustrative visualizations of how outputs of different encoders 114 may be synchronized are shown. Specifically, the illustrative visualization of FIG. 5A depicts how content between two encoders may be synchronized in the event of frame loss at one but not all encoders, while the illustrative visualization of FIG. 5B depicts how content between two encoders may be synchronized in instances where the encoders begin encoding a content stream at different times.

As depicted in FIG. 5A, a first and second encoder, "Encoder A" and "Encoder B," may begin encoding audio and video content at a first point in time, represented as timecode "1:12:03; 20" (1 hour, 12 minutes, 3 seconds, and 20 frames). Each encoder may begin with the same or interchangeable parameters (e.g., the same initial timestamp and audio sample count, the same GOP size, etc.). In FIG. 5A, both encoders encode content synchronously for the first three GOPs, until timecode 1:12:08; 05. For the purposes of illustration, each encoder is configured to begin audio segments at the next available audio frame point after the beginning of a GOP. Thus, because the video GOPs are aligned, and the audio frames are also aligned. Moreover, because both encoders started at the same point, the timestamp values and audio sample values of the output are expected to be identical. During encoding of the first three GOPs, both encoders may periodically generate state information, and transmit it between one another and any other encoders within the relevant encoder pool. Both encoders may further compare received state information, and verify that they are synchronized.

However, at timecode 1:12:08; 05 (which corresponds to the beginning of a GOP for illustrative purposes, but is not required to do so), a 15 frame portion of the content stream is lost by Encoder B (e.g., due to UDP packet loss, malfunction, etc.). Because each encoder is configured to encode GOPs with a set number of frames, the fourth GOP of each encoder corresponds to different frames of the content. Specifically, Encoder A begins GOP 4 at timecode 1:12:08; 05, and includes within the GOP the next 45 frames of content. However, because Encoder B has lost frames between timecode 1:12:08; 05 and timecode 1:12:08; 20, Encoder B begins GOP 4 at timecode 1:12:08; 20, and ends that GOP 45 frames later, at timecode 1:12:10; 05.

As described above, each encoder may periodically generate and transmit state information regarding its encoding to each other encoder. For the purposes of FIG. 5A, it will be assumed that the state information of Encoder A is received at Encoder B at the timecode 1:12:10; 10, where both encoders have begun encoding of GOP 5, though in an unsynchronized state. Encoder B can compare the state information to determine that it has become out of sync with Encoder A. For example, Encoder B can determine from the state information that Encoder A began encoding GOP 4 at timecode 1:12:08; 05, while Encoder B began encoding GOP 4 at timecode 1:12:08; 20. Further, Encoder B can determine that the state information of Encoder A is authoritative. Where the encoders are configured to assume that the "oldest" state information is authoritative (e.g., earliest timecode for a given GOP), Encoder B can select Encoder A's state information as authoritative without other inputs. Where the encoders are configured to determine authoritative state information according to other consistency-ensuring protocols, such as a quorum protocol, Encoder B may select Encoder A's state information as authoritative based on other information, such as state information of other encoders (now shown in FIG. 5A).

After selecting Encoder A's state information as authoritative, Encoder B may resynchronize itself to that state. Illustratively, Encoder A's state information may indicate that Encoder A will begin a next GOP at timecode 1:12:11; 05, and may further indicate other information about the encoding at that point (e.g., timestamp values or offset, audio sample count values, frames processed, etc.). Thus, Encoder B may also begin a next GOP at that timecode, adopting the state information of Encoder A. Where Encoder A's state information does not indicate a next timecode at which Encoder A will begin a GOP, Encoder B may nevertheless calculate the next timecode based on the state information (e.g., by incrementing the timecode at which Encoder A began a past GOP by the number of frames in a GOP). Thus, at timecode at timecode 1:12:11; 05, both Encoders A and B begin GOP 6, and return to a synchronized state. To ensure that the encoders remain synchronized, they may continue to generate and share state information between one another, as described above.

While FIG. 5A is described above with reference to transmission of state information between encoders, the illustration may further apply to embodiments in which a central controller (e.g., a content ingestor) is used to synchronize encoders. For example, at points in time between timecode 1:12:08; 05 and 1:12:10; 10, both Encoder A and Encoder B may generate state information, and transmit the state information to a centralized controller. The centralized controller may determine that Encoder B has become desynchronized (by virtue of its state information differing from authoritative state information), and transmit a resynchronization comment to Encoder B at timecode 1:12:10; 10. The encoders may then resume synchronous encoder at GOP 6, as described above.

With reference to FIG. 5B, an illustrative visualization showing how content between two encoders may be synchronized when a first encoder begins encoding a content stream at a first point in time, and a second encoder that begins encoding the content stream at a later point in time. As in FIG. 5A, two encoders, Encoder A and B, are shown; however, embodiments of the present disclosure may relate to any number of encoders.

In FIG. 5B, Encoder A begins encoding content at timecode 1:12:03; 20. During encoding, the Encoder A may periodically generate and submit state information to other encoders (if present) or a multicast address associated with other encoders. At a later point in time, corresponding to timecode 1:12:08; 20, a second encoder, Encoder B, begins to encoder the content. In one embodiment, Encoder B may be configured to begin encoding content immediately (e.g., without obtaining or synchronizing state information with Encoder A), and to resynchronize after receiving state information. However, for the purposes of FIG. 5B, it will be assumed that Encoder B is configured, on beginning to encoder a content stream that is already being encoder by another encoder (e.g., on joining an encoder pool), to wait until state information of the other encoder or encoders is received. In one embodiment, Encoder B may actively request state information of other encoders (e.g., by transmitting a request via a multicast address associated with other encoders). In another embodiment, Encoder B may passively await reception of state information of other encoders.

At a point in time between timecodes 1:12:08; 20 and 1:12:09; 20, Encoder B receives the state information of Encoder A. As discussed above, the state information of Encoder A may illustratively include information identifying a next timecode at which Encoder A will begin a GOP (e.g., GOP 4 at timecode 1:12:08; 20), as well as other state information regarding the state of Encoder A at that timecode (e.g., timestamp values, frames processed, etc.). Additionally or alternatively, the state information may include other information enabling Encoder B to calculate a next timecode at which Encoder A will begin a GOP (e.g., timecodes at which past GOPs began), according to the equations above. For example, the state information may indicate that, at GOP 5, Encoder A will have encoded 180 frames. Thus, Encoder B should also assume that 180 frames have been encoded at that point, for the purposes of its own calculations (e.g., timestamp calculations). The state information can further include a time at which a next audio segment (Segment 5) will begin and a corresponding sample count at that time, or information enabling Encoder B to calculate that time and sample count. For example, assume that Encoders A and B are configured to begin each audio segments at the first complete frame after the beginning of a corresponding GOP, and the content has an audio sample rate of 48 KHz and frames of 1024 samples per frame. Under these assumptions, Encoder B can determine that, if the state information indicates that an audio frame began at timecode 1:12:03; 20, after six seconds (at a timecode of 1:12:09; 20), 281.25 audio frames have been output by encoder A. Thus, the encoder B must wait 0.75 audio frames (768 samples, or 0.016 seconds) to begin an audio segment corresponding to GOP 5. Similar calculations may be completed based on any value for times at which prior audio frames began at Encoder A.

Thus, Encoder B may determine that the state information of Encoder A is authoritative (e.g., by virtue of it being the only state information available, the oldest state information, or the state information shared by a majority of encoders in a pool), and adopt that state information as its own. Thereafter, at timecode 1:12:09; 20, Encoder B can begin encoding content synchronously to Encoder A. The encoders may periodically share state information to ensure that they remain synchronized.

As in FIG. 5A, while FIG. 5B is described above with reference to transmission of state information between encoders, the illustration may further apply to embodiments in which a central controller (e.g., a content ingestor) is used to synchronize encoders.

Figure 6:
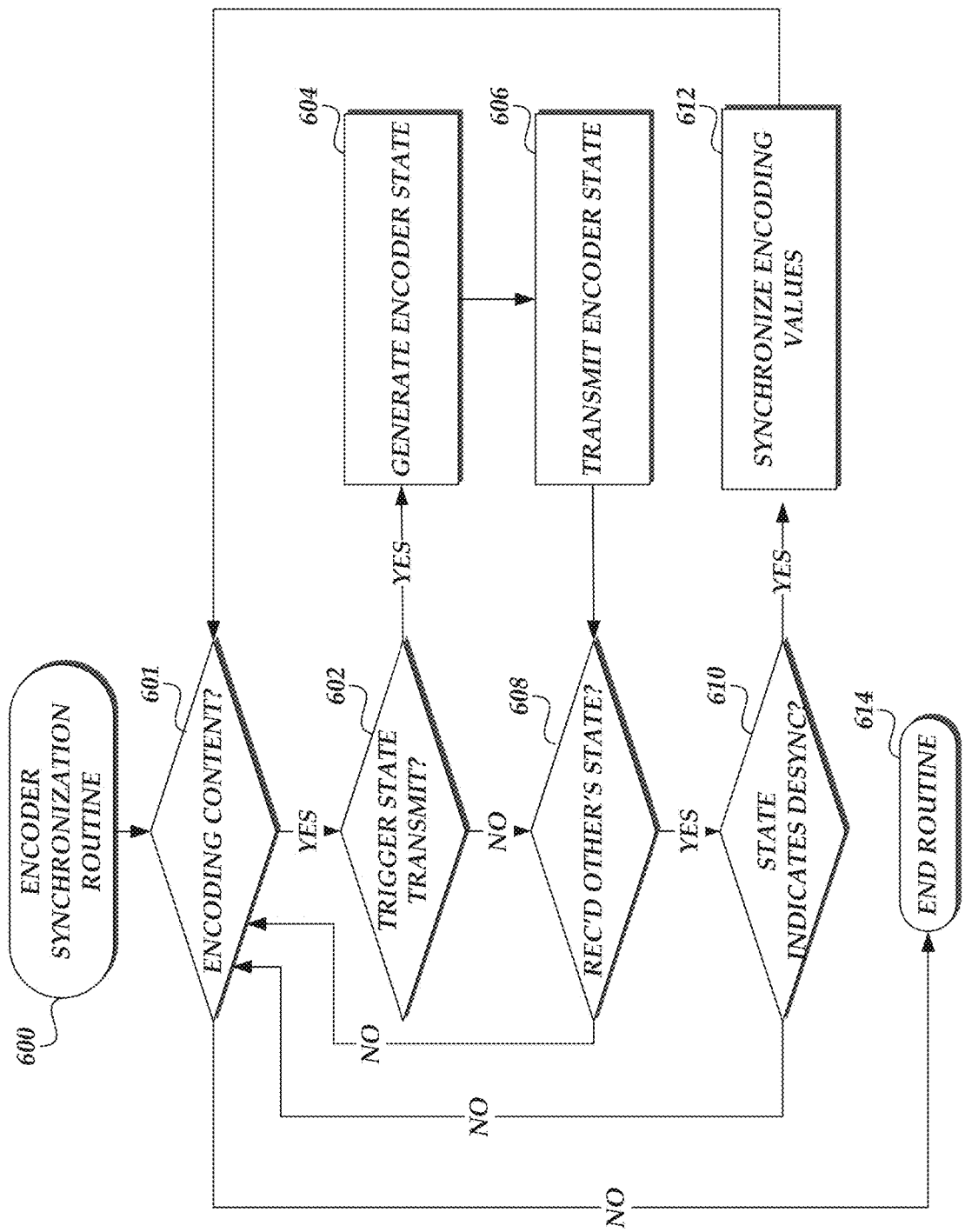
FIG. 6 is a flow chart depicting an illustrative routine for encoding content utilizing an encoding state synchronized to other content encoders.

With reference to FIG. 6, one illustrative routine 600 that may be implemented by an encoder to encode content synchronously with other encoders in a pool is depicted. The routine 600 may be implemented, for example, by each encoder 114 of FIG. 1. Illustratively, the routine 600 can function as a "while" loop, running continuously while an encoder is encoding content. Accordingly, the routine 600 begins at block 601, where the encoder determines whether content is currently begin encoded. If so, the routine continues at block 602, where the encoder determines whether state information regarding the encoding should be transmitted to other encoders of the pool. In one embodiment, the encoder may transmit state information at periodic intervals (e.g., every n seconds, n frames, etc.). If state information should be transmitted, the routine 600 continues to block 604, where the encoder generates the state information. As discussed above, the state information may include any information regarding the state of the encoder, including a mapping of timecodes of content input to corresponding timestamps of content output, designations for alignment of audio video segments, number of frames of audio or video processed by an encoder, etc. The state information may further include forward-looking information, such as the next timecode at which the encoder expects to begin an audio or video segment. After generating the state information, the encoder transmits the state information at block 606. In one embodiment, the state information is transmitted to other encoders (e.g., directly, via a multicast address, or via a messaging service). In another embodiment, the state information is transmitted to a central control device (e.g., a content ingestor) configured to ensure that the encoders remain synchronized.

The routine 600 then continues to block 608, where the encoder determines whether state information of another encoder has been received. In one embodiment, the state information is received from other encoders. In another embodiment, the state information is obtained from a central controller. At block 610, the encoder determines whether the received state information indicates that it has become desynchronized. For example, where the state information is received from a controller in conjunction with a resynchronization command, the encoder can determine that it has become desynchronized. As a further example, where the state information is received from one or more other encoders, differs from the state information of the encoder itself, and where the encoder determines that the received state information is authoritative, the encoder can determine that it has become desynchronized.

The routine 600 then continues to block 612, where the encoder uses the state information to resynchronize its encoding. Illustratively, the encoder may directly adopt the obtained state information as its own state, by beginning an audio or video segment (e.g., a GOP) at a point in time indicated in the state information, using the timestamps and other values from the state information. Additionally or alternatively, the encoder may use values from the state information to calculate values for its own state, according to the equations above, and adopt those values. Thus, the encoder can become synchronized with the state information, and therefore with the other encoders within the pool. The routine 600 then returns to block 601, where it can continue until no further encoding is necessary. The routine 600 then ends at block 614.

While described in FIG. 6 as a single routine, an encoder may in some instances implement the routine 600 as a series of sub-routines, executed at least partly in parallel. For example, an encoder may execute a first routine consisting of blocks 602 through 606, to ensure that state information is transmitted to other encoders. The encoder may further execute a second routine consisting of blocks 608 through 610 at each time that state information of another encoder is received, to synchronize to that state information as needed. Thus, the ordering of operations within the routine 600 is intended to be illustrative in nature.

Figure 7:
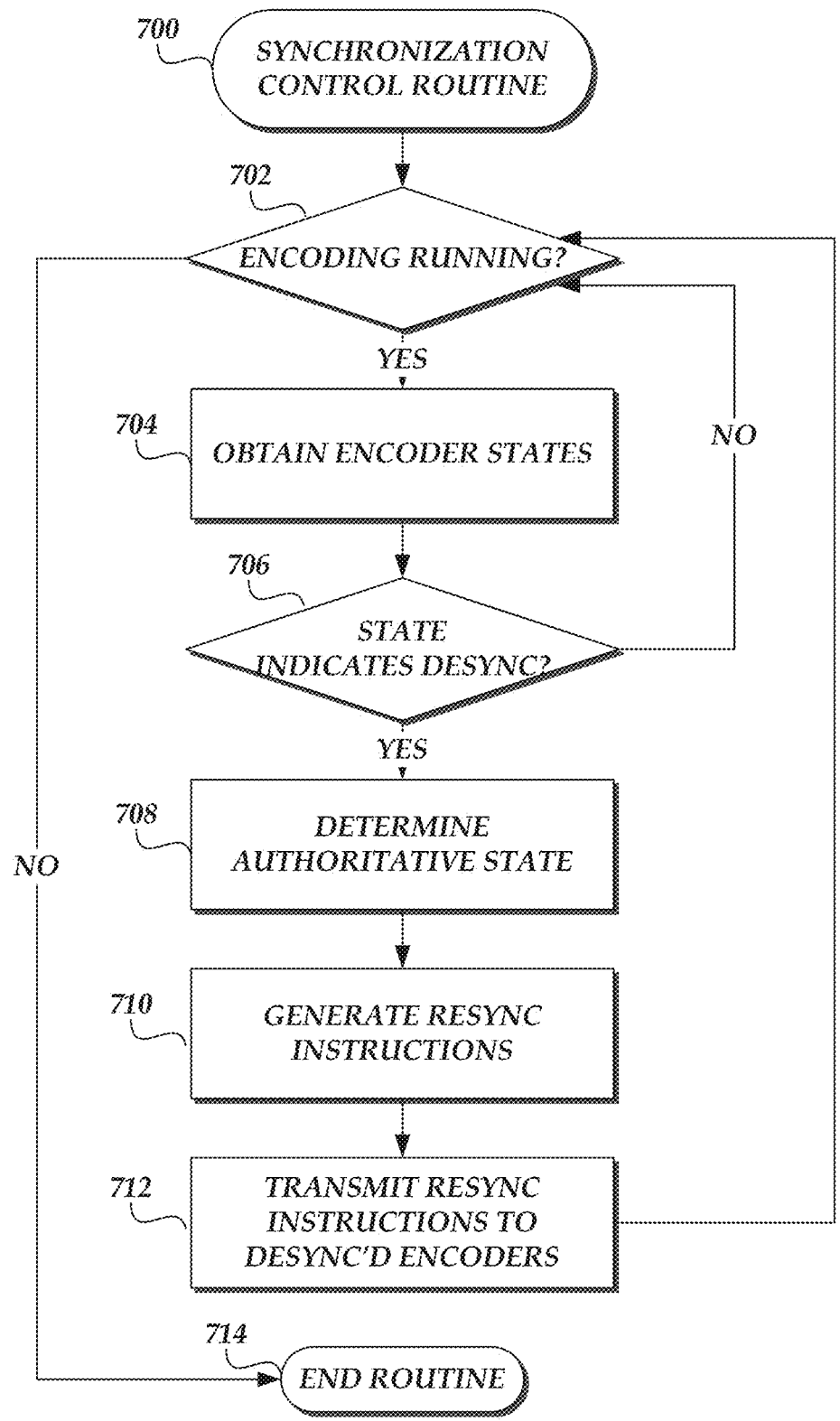
FIG. 7 is a flow chart depicting an illustrative routine for controlling synchronization of encoding by multiple encoders from a centralized controller.

With reference to FIG. 7, one illustrative routine 700 that may be implemented by a centralized controller, to facilitate synchronization of encoders within an encoder pool, is depicted. The routine 700 may be implemented, for example, by the ingestor 111 of FIG. 1. Illustratively, the routine 700 can function as a "while" loop, running continuously while encoders of the pool are encoding content. Accordingly, the routine 700 begins at block 702, where the controller determines whether content is currently begin encoded. If so, the routine continues at block 704, where the controller obtains state information about the encoders in the pool. In one embodiment, the controller passively receives state information from the encoders. In another embodiment, the controller may actively query controllers for state information.

At block 706, the controller determines whether the obtained state information is indicative of a desynchronization within the encoder pool. Illustratively, the controller may determine that a desynchronization has occurred, where the state information of various controllers indicates that encoded content is not identical or interchangeable (e.g., where the same timecode of content has been assigned different timestamps, where segmentations boundaries differ between the content, etc.). If a desynchronization has occurred, the routine 700 continues to block 708, where the controller determines an authoritative state. As described above, any number of constituency-ensuring algorithms may be utilized to determine an authoritative state among differing state information, such as assuming that the "oldest" state information is the most authoritative, or assuming that state information shared among a quorum of the encoders within the pool is authoritative.

The routine 700 then continues to block 710, where the controller generates resynchronization instructions to any encoders whose state information is not synchronized to the authoritative state information. Illustratively, the resynchronization instructions can include a command to resynchronization, as well as state information usable to resynchronize. The state information of the command may include, for example, the authoritative state information, the state information that should be adopted by the encoder to be resynchronized (e.g., as calculated from the authoritative state information), or both. At block 712, the controller transmits the resynchronization instructions to the desynchronized encoders, which the encoders may use to resynchronize themselves to the pool (as discussed above).

The routine 700 then returns to block 702, and may continue while encoders of the pool are encoding. The routine 700 can then end at block 714.

While one ordering of operations is illustratively shown in FIG. 7, the present disclosure contemplates other orderings as well. For example, in on embodiment, a controller may operate to continuously maintain authoritative state information, and update the state information as necessary when additional state information is received. The controller may further operate to determine desynchronizations at each time that state information is received. Thus, in response to each received state information, the controller may either: 1) determine that the state information matches the authoritative state information, and thus no action is required, 2) determine that the state information is more authoritative that the current authoritative state information, an thus update the state information, or 3) determine that the state information is less authoritative that the current authoritative state information, and thus transmit resynchronization to the encoder form which the state information was received. In some instances, the controller may further function to maintain a current state of each encoder, and to transmit resynchronization instructions to any encoder that does not match the authoritative state information. Thus, the ordering of operations within the routine 600 is intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for synchronized encoding of video content, the system comprising:
    a first encoder within a pool of encoders, the first encoder comprising one or more first processors configured to:
        obtain input data representing a content stream, wherein locations within the content stream are designated by timecodes included within the input data by a source device;
        determine timecodes, within the content stream, at which to encode a plurality of content segments, wherein each content segment is determined to be encoded at an individual timecode of the determined timecodes;
        encode the input data to generate a first encoded content representing the content stream, the first encoded content comprising the plurality of content segments, wherein encoding the input data comprises generating the plurality of encoded content segments at the timecodes, within the content stream, at which the first encoder determined to encode the plurality of content segments;
        during encoding of the input data, periodically generate state information regarding a state of the first encoder, the state information designating at least some of the timecodes, within the content stream, at which the first encoder determined to encode the plurality of content segments to result in the first encoded content;
        transmit to other encoders within the pool of encoders the state information designating at least some of the timecodes within the content stream at which the first encoder determined to encode the plurality of content segments to result in the first encoded content; and
        output the first encoded content; and
    a second encoder within the pool of encoders, the second encoder comprising one or more second processors configured to:
        obtain the input data;
        obtain the state information from the first encoder;
        determine, from state information from at least two encoders within the pool of encoders, that the state information from the first encoder is authoritative, wherein to determine that the state information is authoritative, the one or more second processors are further configured to:
            determine that the state information from the first encoder has an earlier timecode than a respective timecode from state information from at least one other encoder of the pool of encoders;
        determine, using the state information designating at least some of the timecodes, within the content stream, at which the first encoder determined to encode the plurality of content segments to result in the first encoded content, a timecode within the content stream for the second encoder to place an encoded content segment of a second encoded content;
        encode the input data to generate the second encoded content, wherein encoding by the second encoder comprises encoding the encoded content segment of the second encoded content at the timecode within the content stream, and wherein encoding the encoded content segment of the second encoded content at the timecode within the content stream results in the second encoded content being interchangeable with the first encoded content; and
        output the second encoded content.

2. The system of claim 1, wherein the content stream represents live streaming content.

3. The system of claim 1, wherein the first and second encoders each include an interface through which to receive the input data, and wherein the interface is at least one of an serial digital interface (SDI) or a network interface.

4. The system of claim 1, wherein the state information further includes a timestamp offset value, and wherein the one or more processors of the second encoder are further configured to place, within the second encoded content, timestamp values offset by at least the timestamp offset value.

5. The system of claim 4, wherein the timestamp offset value is represented by at least one of a number of frames encoded by the first encoder or a mapping between timecodes of frames obtained by the first encoder and corresponding timestamps applied to the frames by the first encoder.

6. A computer-implemented method for synchronized encoding of content, the computer-implemented method comprising:
    obtaining, at a first encoder, input data representing a content stream, wherein locations within the content stream are designated by timecodes included within the input data by a source device;
    obtaining, at the first encoder, state information of a second encoder encoding the input data, wherein the state information is generated by the second encoder and indicates an alignment of segments encoded by the second encoder within a second encoding of the content stream generated by the second encoder, the state information designating timecodes, within the content stream, at which the second encoder determined to encode the alignment of segments;
    determining, from state information from at least two encoders of a plurality of encoders, that the state information from the second encoder is authoritative, wherein determining that the state information is authoritative further comprises:
        determining that the state information from the second encoder has an earlier timecode than a respective timecode from state information from at least one other encoder of the plurality of encoders;
    determining, at the first encoder and from the alignment of segments encoded within the second encoding of the content stream by the second encoder and from the state information designating the timecodes, a timecode within the content stream for the first encoder to place a first encoded content segment in a first encoding;

encoding, at the first encoder, the input data to generate the first encoding, wherein encoding the input data comprises placing the first encoded content segment at the timecode;

at intervals occurring during encoding of the input data, generating, at the first encoder, state information of the first encoder including at least a designation of the timecode within the content stream at which the first encoder determined to encode the first encoded content to result in the first encoding;

transmitting the state information from the first encoder to the second encoder; and outputting the first encoding.

7. The computer-implemented method of claim 6, wherein outputting the first encoding comprising outputting the first encoding to a packager comprising one or more processors configured with computer-executable instructions to package the first encoding into a container.

8. The computer-implemented method of claim 7, wherein the container corresponds to at least one of a Matroska, FLV, Motion JPEG, MPEG-4 Part 12, VOB, Ogg, Audio Video Interleave ("AVI"), Quicktime, Advanced Systems Format ("ASF"), MPEG-Transport Stream ("MPEG-TS"), or RealMedia container.

9. The computer-implemented method of claim 7, wherein the container corresponds to a plurality of containers generated in accordance with at least one of the Hypertext Transport Protocol ("HTTP") Live Streaming ("HLS") protocol or MPEG Dynamic Adaptive Streaming over HTTP ("MPEG-DASH") protocol.

10. The computer-implemented method of claim 6, wherein encoding, at the first encoder, the input data to generate the first encoding comprises encoding the input data according to a set of parameters also used by the second encoder to encode the input data into the second encoding.

11. The computer-implemented method of claim 6 further comprising:

receiving, at the first encoder, updated state information of the second encoder, wherein the updated state information indicates an updated alignment of segments encoded within the second encoding by the second encoder and second timecodes within the content stream, and wherein the updated alignment of segments differs from the previously obtained alignment of segments;

determining, at the first encoder, that the updated alignment of segments is authoritative when compared to a current alignment of segments encoded within the first encoding by the first encoder, and that the second timecodes are authoritative when compared to current timecodes within the content stream at which the first encoder determined to encode encoded content segments; and modifying, at the first encoder, generation of the first encoding to conform to the updated alignment of segments and the second timecodes.

12. The computer-implemented method of claim 11, wherein determining that the updated alignment of segments encoded is authoritative further comprises:

determining that the updated state information is shared by a quantity of other encoders above a threshold.

13. The computer-implemented method of claim 11, wherein the first and second encoders are included within a pool of encoders, and wherein determining that the updated alignment of segments encoded is authoritative comprising determining that the updated alignment of segments matches an alignment of segments utilized by a majority of encoders within the pool of encoders.

14. Non-transitory computer-readable storage media including computer executable instructions that, when executed by a first encoding system comprising one or more processors, cause the first encoding system to:

obtain input data representing a content stream, wherein locations within the content stream are designated by timecodes included within the input data by a source device;

obtain state information of a second encoding system that is encoding the input data into a second encoding of the content stream, the state information indicating values encoded into the second encoding by the second encoding system, the state information designating timecodes, within the content stream, at which the second encoding system determined to encode the input data;

determine, from state information from at least two systems of a plurality of encoding systems, that the state information from the second encoding system is authoritative, wherein to determine that the state information is authoritative, the computer executable instructions further cause the first encoding system to:

determine that the state information from the second encoding system has an earlier timecode than a respective timecode from state information from at least one other system of the plurality of encoding systems;

determine values to be encoded based at least partly on the state information of the second encoding system;

determine, using the state information designating the timecodes, within the content stream, at which the second encoding system determined to encode the input data, a timecode within the content stream;

encode the input data to generate a first encoding, wherein to encode the input data comprises:

encode a content segment at the timecode within the content stream;

generate, periodically during encoding of the input data, state information of the first encoding system including the values encoded into the first encoding;

transmit the state information from the first encoding system to the second encoding system; and output the first encoding.

15. The non-transitory computer-readable storage media of claim 14, wherein the values encoded into the second encoding by the second encoding system include at least one of timestamps encoded within the second encoding or an alignment of segments encoded within the second encoding.

16. The non-transitory computer-readable storage media of claim 15, wherein the segments are at least one of video segments or audio segments.

17. The non-transitory computer-readable storage media of claim 16, wherein individual video segments comprise one or more groups of pictures.

18. The non-transitory computer-readable storage media of claim 14, wherein the state information of the second encoding system further includes values expected to be encoded into the second encoding by the second encoding system, and wherein the computer executable instructions cause the first encoding system to determine values to be encoded into the first encoding at least partly by adopting the values expected to be encoded into the second encoding by the second encoding system as encoding values for the first encoding system.

19. The non-transitory computer-readable storage media of claim 14, wherein the computer executable instructions cause the first encoding system to determine values to be encoded into the first encoding at least partly by calculating values expected to be encoded into the second encoding by the second encoding system from the state information of the second encoding system.

20. The non-transitory computer-readable storage media of claim 14, wherein the first encoding is encoded according to at least one of H.263, H.264, H.265, APPLE Intermediate Codec, ProRes, VP3 through 9, MPEG-2 part 2, RealVideo, Dirac, Theora, and MPEG-4 Part 2, Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), or RealAudio formats.

21. The non-transitory computer-readable storage media of claim 14, wherein the computer executable instructions cause the first encoding system to encode the input data to generate the first encoding at least partly by encoding the input data according to a set of parameters interchangeable with a set of parameters used by the second encoding system to encode the input data.

22. The non-transitory computer-readable storage media of claim 21, wherein the set of parameters used by the first encoding system and the set of parameters used by the second encoding system differ according to at least one of resolution, bitrate, or frame rate.

23. The non-transitory computer-readable storage media of claim 14, wherein the computer executable instructions further cause the first encoding system to:
  receive updated state information of the second encoding system, wherein the updated state information indicates updated values encoded into the second encoding by the second encoding system and second timecodes within the content stream, and wherein the updated values differ from the previously obtained values encoded into the second encoding by the second encoding system;
  determine that the updated values are authoritative when compared to current values encoded within the first encoding by the first encoding system, and that the second timecodes are authoritative when compared to current timecodes within the content stream at which the first encoder determined to encode content segments; and
  modify encoding of the input data to conform to the updated values and the second timecodes.

* * * * *